United States Patent
Yamashita et al.

(10) Patent No.: US 8,761,004 B2
(45) Date of Patent: Jun. 24, 2014

(54) NETWORK SYSTEM

(75) Inventors: Atsuya Yamashita, Tokyo (JP); Shinya Kurosaki, Tokyo (JP); Satoshi Ishikura, Tokyo (JP); Hiroaki Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 184 days.

(21) Appl. No.: 13/376,734

(22) PCT Filed: Jun. 14, 2010

(86) PCT No.: PCT/JP2010/003915
§ 371 (c)(1),
(2), (4) Date: Jan. 18, 2012

(87) PCT Pub. No.: WO2010/150478
PCT Pub. Date: Dec. 29, 2010

(65) Prior Publication Data
US 2012/0106323 A1    May 3, 2012

(30) Foreign Application Priority Data

Jun. 22, 2009  (JP) ................................. 2009-147317

(51) Int. Cl.
*H04L 12/26* (2006.01)
(52) U.S. Cl.
USPC ....................................................... 370/225
(58) Field of Classification Search
CPC .... H04L 12/462; H04L 12/66; H04L 12/6418
USPC ........................... 370/216, 217, 220, 221, 225
See application file for complete search history.

(56) References Cited

U.S. PATENT DOCUMENTS

| | | | |
|---|---|---|---|
| 6,192,485 B1* | 2/2001 | Takita et al. | 714/6.1 |
| 6,377,574 B1* | 4/2002 | Endo | 370/359 |
| 6,628,616 B2* | 9/2003 | Licht | 370/232 |
| 6,738,344 B1 | 5/2004 | Bunton et al. | |
| 6,801,504 B1* | 10/2004 | Ito | 370/242 |

(Continued)

FOREIGN PATENT DOCUMENTS

| | | |
|---|---|---|
| JP | 11-203157 | 7/1999 |
| JP | 2001-313652 | 11/2001 |
| JP | 2005-033665 | 2/2005 |
| JP | 1 675 356 | 6/2006 |

OTHER PUBLICATIONS

International Search Report, PCT/JP2010/003915, Aug. 31, 2010.
Extended European Search Report—PCT/JP2010/003915—Mar. 17, 2014.

*Primary Examiner* — Chi Pham
*Assistant Examiner* — Robert Lopata
(74) *Attorney, Agent, or Firm* — Young & Thompson

(57) ABSTRACT

A link control function unit 506 of a device 500 notifies a counterpart device 600 of a line in which a link disconnection occurs among lines 508 to 510 and L500 terminated at line terminals 501 to 503 or a lower stage line terminal 504 of the self device 500 and the cause of the link disconnection is not a forcible closure of a line terminal of the self device. Further, the link control function unit 506 does not forcibly close the lower stage line terminal 504 of the self device 500 if a line in which a link disconnection occurs, notified from the counterpart device 600, is a line terminated at a lower stage line terminal 604 of the counterpart device 600.

15 Claims, 13 Drawing Sheets

(56) References Cited

U.S. PATENT DOCUMENTS

| | | | |
|---|---|---|---|
| 6,816,483 B1* | 11/2004 | Beckstrom et al. | 370/356 |
| 7,359,331 B2* | 4/2008 | Takamichi | 370/245 |
| 7,719,956 B2* | 5/2010 | Yamauchi | 370/216 |
| 8,130,634 B2* | 3/2012 | Bakhru | 370/216 |
| 8,144,621 B2* | 3/2012 | Fujita et al. | 370/254 |
| 8,233,383 B2* | 7/2012 | Kitani et al. | 370/220 |
| 8,248,954 B2* | 8/2012 | Miller et al. | 370/242 |
| 8,385,816 B2* | 2/2013 | Toyoda et al. | 455/9 |
| 8,527,616 B2* | 9/2013 | Kitani et al. | 709/223 |
| 2001/0036153 A1 | 11/2001 | Sasaki et al. | |
| 2003/0218996 A1* | 11/2003 | Sumino et al. | 370/328 |
| 2008/0219168 A1* | 9/2008 | Enomoto et al. | 370/237 |
| 2009/0141622 A1* | 6/2009 | Bitar | 370/225 |
| 2011/0051598 A1* | 3/2011 | Oldershaw et al. | 370/221 |
| 2012/0294313 A1* | 11/2012 | Mitsuhashi | 370/401 |

* cited by examiner

NETWORK SYSTEM

TECHNICAL FIELD

The present invention relates to a link loss forwarding technique for notifying a counterpart device of occurrence of a link disconnection when a link disconnection occurs in a network device such as a network relay device or a media converter.

BACKGROUND ART

When a link disconnection occurs in a network device such as a network relay device or a media converter, a technique of notifying the counterpart device of occurrence of a link disconnection and forcibly disconnecting a link between the counterpart device and the subsequent device is known (For example, see Patent Document 1). Such control is called link loss forwarding. The grounds for performing link loss forwarding are to allow the subsequent device to recognize occurrence of a link disconnection so as to stop useless data transfer which will be wasted or to transfer data via a detour path.

When performing link loss forwarding, a deadlock may occur. As shown in FIG. 12 for example, when a link disconnection "a" occurs between a network relay device 100 and a L2SW (Layer 2 Switch) 101, the network relay device 100 notifies a network relay device 200, which is a counterpart device, of occurrence of the link disconnection "a". Upon receiving the notification, the network relay device 200 forcibly causes a link disconnection "b" between it and the L2SW 201. Further, the network relay device 200 notifies the network relay device 100, which is the counterpart device, of occurrence of the link disconnection "b". With this notification, as the network relay device 100 recognizes that the link disconnection "b" occurred in the counterpart device, even when the link disconnection "a", which is the original failure, is recovered, the network relay device 100 forcibly causes the link disconnection "a". As such, the network relay devices 100 and 200 are in a deadlock state where the respective devices wait for link recovery of the counterpart device.

In order to prevent occurrence of such a deadlock state, Patent Document 1 discloses that after the link disconnection "b" is forcibly caused by the network relay device 200, a link disconnection transfer starting frame for instructing prohibition of a forcible link disconnection between the network relay device 100, which is the counterpart device, and the L2SW 101 is transmitted to the network relay device 100. Thereby, when the link disconnection "a" is recovered, the network relay device 100 never causes a forcible link disconnection, so that occurrence of a deadlock state can be prevented.

Patent Document 1: JP 2005-33665 A

In the network system as shown in FIG. 12, if an inter-device interface connecting the network relay device 100 and the network relay device 200 is formed of a low capacity line, frames might be discarded. In order to prevent occurrence of such a situation, network relay devices, arranged opposite each other, may be connected in multiple stages as shown in FIG. 13.

In the network device shown in FIG. 13, network relay devices 300 and 400, arranged opposite each other in the first stage, respectively transmit part of frames input from L2SW 303 and 403 to the counterpart devices via an inter-device interface 500, and transmit the rest of the frames to network relay devices 301 and 401 in the second stage via lines 304 and 404. The network relay devices 301 and 401 of the second stage respectively transmit part of the frames transmitted via the lines 304 and 404 to the counterpart devices via an inter-device interface 501, and transmit the rest of the frames to network relay devices 302 and 402 in the third stage via lines 305 and 405. The network relay devices 302 and 402 in the third stage respectively transmit the frames transmitted via the lines 305 and 405 to the counterpart devices via an inter-device interface 502. In this way, by connecting the network relay devices in multiple stages to realize redundant inter-device interfaces, as the load can be distributed to the inter-device interfaces, it is possible to reduce a risk of frames being discarded due to capacity shortage of the inter-device interfaces.

Meanwhile, even in the system as shown in FIG. 13, a deadlock may occur when link loss forwarding is performed. For example, when a link disconnection "c" occurs in the line 405 of the network system shown in FIG. 13, the network relay devices 401 and 402 respectively notify the network relay devices 301 and 302, which are the counterpart devices thereof, of occurrence of the link disconnection "c". Upon receiving the notification, the network relay devices 301 and 302 respectively cause a link disconnection "d" forcibly, and notify the counterpart devices 401 and 402 of occurrence of the link disconnection "d". Accordingly, the network relay devices 401 and 402 respectively recognize occurrence of the link disconnection "d". As such, even when the link disconnection "c", which is the original failure, is recovered, as the link disconnection "c" is forcibly caused, a deadlock state occurs. It should be noted that as the technique described in Patent Document 1 is for preventing occurrence of a deadlock which may be caused by link loss forwarding performed on a network system without any branching connections, such a technique is not applicable to a network system in which network devices such as network relay devices are connected in multiple stages to realize redundant inter-device interfaces.

SUMMARY

In view of the above, an object of the present invention is to provide a network system capable of solving a problem that link cross forwarding cannot be performed without causing a deadlock in a network system in which network devices, arranged opposite each other, are connected in multiple stages to realize redundant inter-device interfaces connecting the paired devices.

A network system, according to an aspect to the present invention, is configured such that a first device and a second device, each having a plurality of line terminals, a lower stage line terminal, and an inter-device line terminal, are arranged opposite each other, the inter-device line terminals of the first device and the second device, arranged opposite each other, are connected by an inter-device interface to thereby form a pair of devices and the pairs of devices are arranged in multiple stages, the lower stage line terminal of a first device arranged on the upper side and one line terminal of a first device arranged on the lower side, in adjacent stages, are connected by a line, and the lower stage line terminal of a second device arranged on the upper side and one line terminal of a second device arranged on the lower side, in adjacent stages, are connected by a line. Each of the devices includes a link control function unit which notifies the counterpart device of a line in which a link disconnection occurs among the lines terminated at the line terminals or the lower stage line terminal of the self device and the cause of the occurrence of the link disconnection is not a forcible closure of a line terminal of the self device, and if a line in which a link disconnection occurs, notified from the counterpart device, is a line other than the line terminated at the lower stage line terminal of the counterpart device, forcibly closes a line terminal of the self device associated with the line in which the link disconnection occurs notified from the counterpart device, while if a line in which a link disconnection occurs, notified from the counterpart device, is the line terminated at the lower stage line terminal of the counterpart device, does not forcibly close the lower stage line terminal of the self device.

A network device, according to another aspect of the present invention, is a network device including a plurality of line terminals, a lower stage line terminal, and an inter-device line terminal. The network device includes a link control function unit which notifies the counterpart network device, via an inter-device interface terminated at the inter-device line terminal, of a line in which a link disconnection occurs among the lines terminated at the line terminals or the lower stage line terminal of the self network device and the cause of the occurrence of the link disconnection is not a forcible closure of a line terminal of the self network device, and if a line in which a link disconnection occurs, notified from the counterpart network device, is a line other than the line terminated at the lower stage line terminal of the counterpart network device, forcibly closes a line terminal of the self network device associated with the line in which the link disconnection occurs notified from the counterpart network device, while if a line in which a link disconnection occurs, notified from the counterpart network device, is the line terminated at the lower stage line terminal of the counterpart network device, does not forcibly close the lower stage line terminal of the self network device.

A link loss forwarding method, according to another aspect to the present invention, includes arranging a first device and a second device opposite each other, each of the devices having a plurality of line terminals, a lower stage line terminal, and an inter-device line terminal, connecting the inter-device line terminals of the first device and the second device, arranged opposite each other, by an inter-device interface to thereby form a pair of devices and arranging the pairs of devices in multiple stages, connecting the lower stage line terminal of a first device arranged on the upper side and one line terminal of a first device arranged on the lower side, in adjacent stages, by a line, and connecting the lower stage line terminal of a second device arranged on the upper side and one line terminal of a second device arranged on the lower side, in adjacent stages, by a line. Each of the devices notifies the counterpart device of a line in which a link disconnection occurs among the lines terminated at the line terminals or the lower stage line terminal of the self device and the cause of the occurrence of the link disconnection is not a forcible closure of a line terminal of the self device, and if a line in which a link disconnection occurs, notified from the counterpart device, is a line other than the line terminated at the lower stage line terminal of the counterpart device, forcibly closes a line terminal of the self device associated with the line in which the link disconnection occurs notified from the counterpart device, while if a line in which a link disconnection occurs, notified from the counterpart device, is the line terminated at the lower stage line terminal of the counterpart device, does not forcibly close the lower stage line terminal of the self device.

Further, a program, according to another aspect of the present invention, is a program for causing a computer to function as a network device, the computer including a plurality of line terminals, a lower stage line terminal, and an inter-device line terminal. The program causes the computer to function as a link control function unit which notifies the counterpart computer, via an inter-device interface terminated at the inter-device line terminal, of a line in which a link disconnection occurs among the lines terminated at the line terminals or the lower stage line terminal of the self computer and the cause of the occurrence of the link disconnection is not a forcible closure of a line terminal of the self computer, and if a line in which a link disconnection occurs, notified from the counterpart computer, is a line other than the line terminated at the lower stage line terminal of the counterpart computer, forcibly closes a line terminal of the self computer associated with the line in which the link disconnection occurs notified from the counterpart computer, while if a line in which a link disconnection occurs, notified from the counterpart computer, is the line terminated at the lower stage line terminal of the counterpart computer, does not forcibly close the lower stage line terminal of the self computer.

According to the present invention, it is possible to perform link cross forwarding without causing a deadlock in a network system in which network devices, arranged opposite each other, are connected in multiple stages to realize redundant inter-device interfaces connecting the paired devices.

EXEMPLARY EMBODIMENTS

First Exemplary Embodiment

Figure 1:
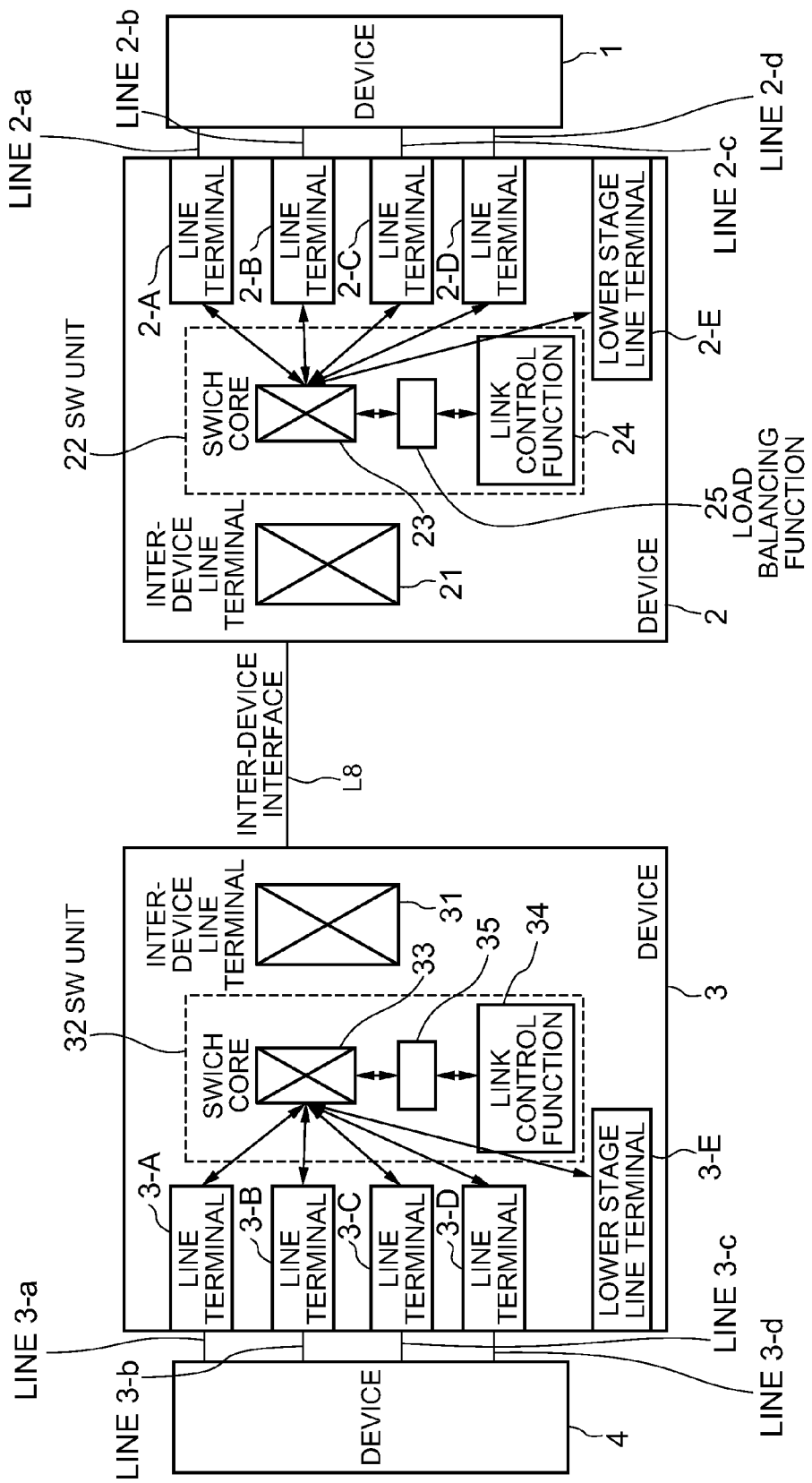
FIG. 1 is a block diagram showing a base configuration (configuration for one stage) according to a first exemplary embodiment of the present invention.

A network system according to the present embodiment is configured such that pairs of devices, arranged opposite each other as shown in FIG. 1, are connected in multiple stages. First, with reference to FIG. 1, the configuration for one stage, which is the base configuration, will be described.

Devices 2 and 3, arranged opposite each other, are network devices such as network relay devices, and are connected via an inter-device interface L8. Further, the devices 2 and 3 are connected with devices 1 and 4 such as L2SWs.

The device 2 includes line terminals 2-A to 2-D for terminating lines 2-1 to 2-d provided between the device 2 and the device 1, a lower stage line terminal 2-E, an inter-device line terminal 21 for terminating an inter-device interface L8, and a switch unit (SW unit) 22. The lower stage line terminal 2-E serves as a communication port to be connected with a lower stage device when the system is configured in multiple stages.

The switch unit 22 includes a switch core 23 having a function of switching between Ethernet frames (may be simply referred to as frames), a link control function unit 24, and a load balancing function unit 25.

The link control function unit 24 has the following functions. In this example, the link control function unit 24 is assumed to operate in a first operation mode among first to third operation modes described below.

Figure 2:
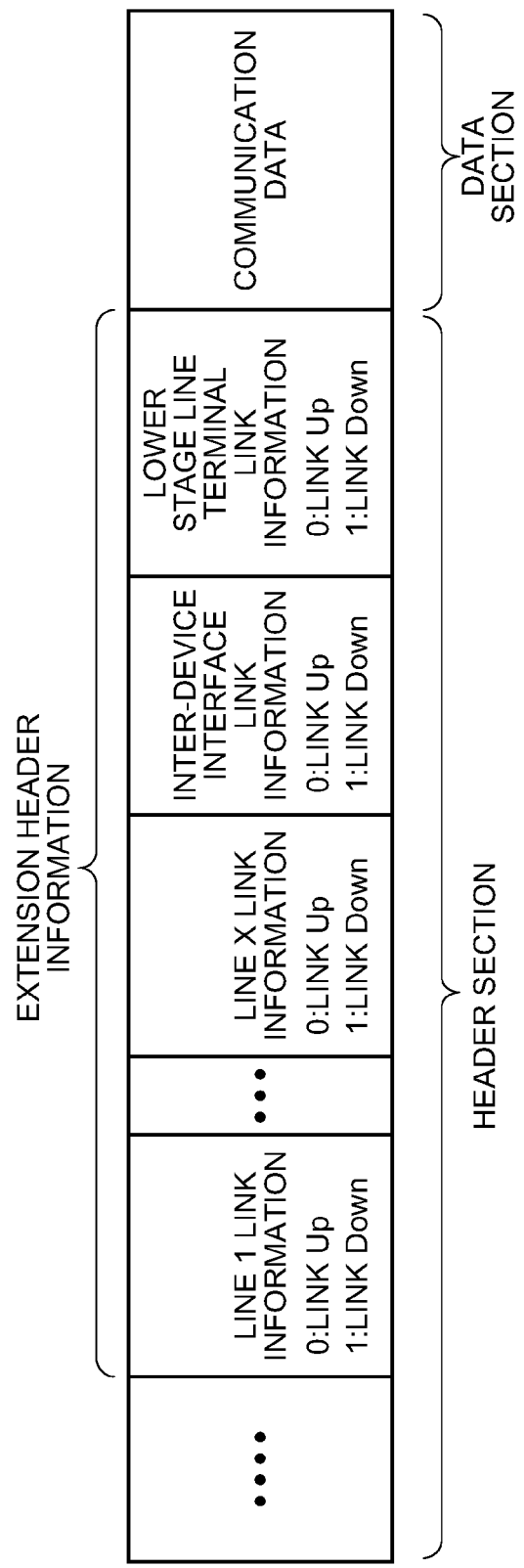
FIG. 2 is a diagram showing an example of an Ethernet (Registered Trademark) frame to be exchanged between devices.

Link information indicating a link state of each of the lines terminated at the self device 2 (lines terminated at the line terminals, the lower stage line terminal, and the inter-device line terminal) is set as extension header information in the header section of an Ethernet frame to be transmitted to the counterpart device 3, as shown in FIG. 2. It should be noted that even in the case where no Ethernet frame has been input via the line terminals 2-A to 2-D, the device 2 transmits an Ethernet frame in which the data section is empty and the extension header information is set in the header section, via the inter-device interface L8. Further, in the present embodiment, as link information, minimum information such as link up and link down is set. In this example, link up indicates a state where communications can be established and link down indicates a state where communications cannot be established.

If the link control function unit 24 determines that a link disconnection occurs in any of the lines 3-a to 3-d terminated at the line terminals 3-A to 3-D of the device 3, based on the extension header information set in the header section of the Ethernet frame transmitted from the counterpart device 3, the link control function unit 24 forcibly closes the corresponding line terminal of the self device 2. As for the line terminated at the forcibly closed line terminal, the link information is set as link up in the extension header information so as to avoid occurrence of a deadlock at the time of link recovery in the lines 3-a to 3-d.

If the link control function unit 24 determines that a link disconnection occurs in the line terminated at the lower stage line terminal 3-E of the counterpart device 3, based on the extension header information set in the header section of the Ethernet frame transmitted from the counterpart device 3, the link control function unit 24 does not forcibly close the lower stage line terminal 2-E.

If the link control function unit 24 determines that a link disconnection is recovered in the line accommodated in the line terminals 3-A to 3-D or the lower stage line terminal 3-E of the counterpart device 3, based on the extension header information set in the header section of the Ethernet frame transmitted from the counterpart device 3, the link control function unit 24 links up the corresponding line terminal or the lower stage line terminal in the self device 2.

The load balancing function unit 25 has the following functions.

If states of both the inter-device interface L8 and the line terminated at the lower stage line terminal 2-E are link up, the load balancing function unit 25 outputs part of the Ethernet frames input via the line terminals 2-A to 2-D to the inter-device interface L8 and outputs the rest to the lower stage line terminal 2-E, in accordance with a predetermined ratio.

If a link disconnection occurs in the inter-device interface L8, if the state of the line terminated at the lower stage line terminal 2-E is link up, the load balancing function unit 25 outputs all of the Ethernet frames input via the line terminals 2-A to 2-D to the lower stage line terminal 2-E, while if the state is link down, forcibly closes the line terminals 2-A to 2-D.

If a link disconnection occurs in the line terminated at the lower stage line terminal 2-E, if the state of the inter-device interface L8 is link up, the load balancing function unit 25 outputs all of the Ethernet frames input via the line terminals 2-A to 2-D to the inter-device interface L8, while if the state is link down, forcibly closes the line terminals 2-A to 2-D.

If the load balancing function unit 25 determines that a link disconnection occurs in the line terminated at the lower stage line terminal 3-E of the counterpart device 3 based on the extension header information set in the header section of the Ethernet frame transmitted from the counterpart device 3, the load balancing function unit 25 outputs all of the Ethernet frames input via the line terminals 2-A to 2-D to the inter-device interface L8.

If the load balancing function unit 25 determines that a link disconnection is recovered in the line terminated at the lower stage line terminal 3-E of the counterpart device 3 based on the extension header information set in the header section of the Ethernet frame transmitted from the counterpart device 3, the load balancing function unit 25 outputs part of the Ethernet frames input via the line terminals 2-A to 2-D to the inter-device interface L8 and outputs the rest to the lower stage line terminal 2-E.

The device 3, which is the counterpart of the device 2, has similar configuration and functions to those of the device 2. Further, the link control function unit 24 and the load balancing function unit 25 are realized by a CPU (Central Processing Unit). In that case, a recording medium such as a disk or a semiconductor memory storing programs for causing the CPU as the link control function unit 24 and the load balancing function unit 25 is prepared, and the CPU is allowed to read the programs. The CPU controls the self operation according to the read programs, whereby the link control function unit 24 and the load balancing function unit 25 are realized on the self CPU.

Figure 3:
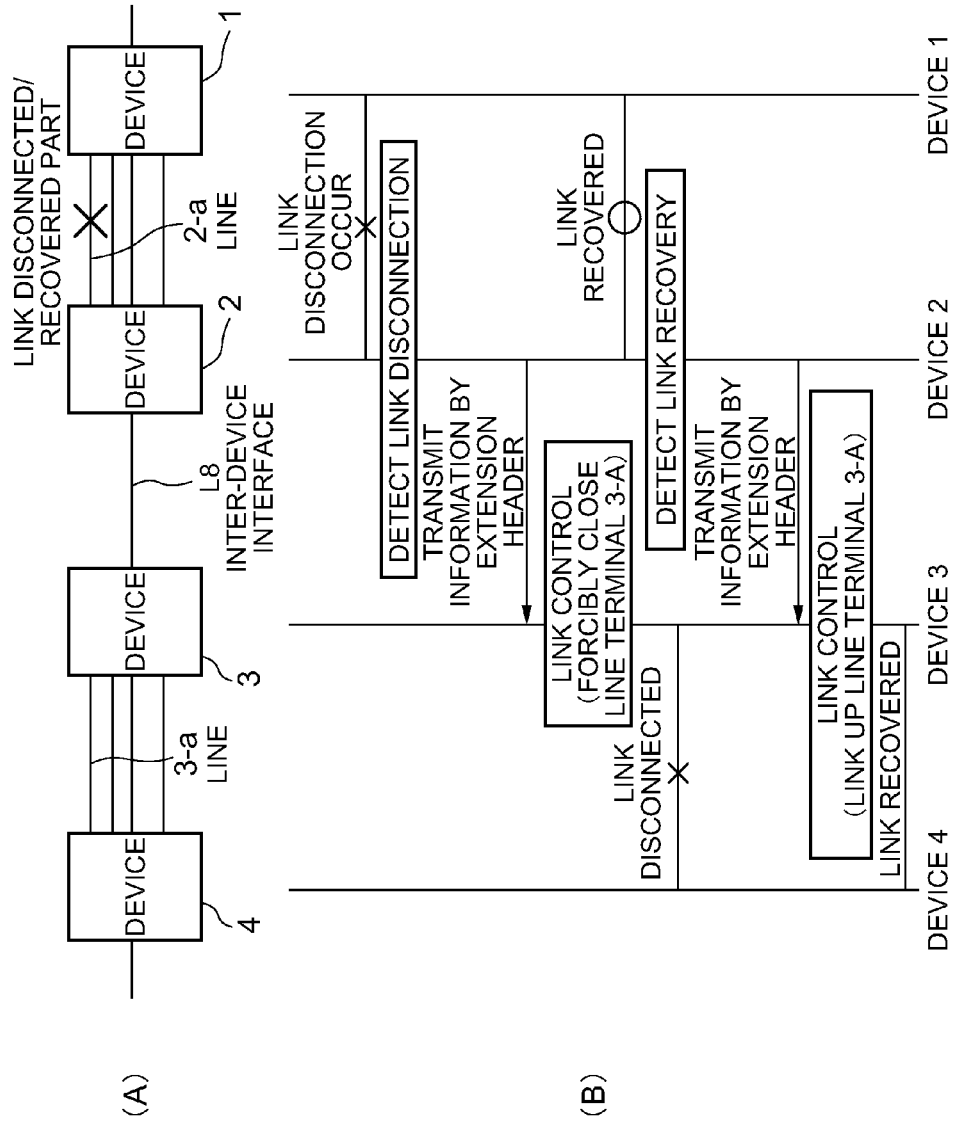
FIG. 3 is a diagram for illustrating an operation of the base configuration of the first exemplary embodiment.

Next, an operation of the base configuration shown in FIG. 1 will be described with reference to FIG. 3 in which FIG. 3(A) shows connection relations among the respective devices 1 to 4 shown in FIG. 1 and FIG. 3(B) shows an operation sequence at the time of performing link loss forwarding with the time axis taken from top to bottom direction. In the description provided below, an operation will be exemplary described as for a case where a link disconnection occurs in a line 2-a between the devices 1 and 2 and then the link is recovered.

When the line terminal 2-A detects that a link disconnection occurs in the line 2-a, the link control function unit 24 of the device 2 sets link information of the line 2-a as link down in the extension header information on the inter-device interface L8 connecting the device 2 and the device 3, and transmits it to the device 3. This means that the link control function unit 24 sets extension header information indicating that the link information of the line 2-*a* is link down in the header section of an Ethernet frame to be transmitted to the device 3, and transmits it to the device 3.

The link control function unit 34 of the device 3 recognizes link down of the line 2-*a* from the extension header information transmitted from the device 2. Thereby, the link control function unit 34 of the device 3 forcibly closes the line terminal 3-A, and disconnects the link of the line 3-*a* connecting the device 3 and the device 4. When setting the link information of the line 3-*a* in the extension header information, as the link was forcibly closed, the link control function unit 34 of the device 3 sets the state as link up and transmits it to the device 2. Thereby, occurrence of a deadlock can be avoided when the link is recovered in the line 2-*a*.

When the link is recovered in the line 2-*a*, the link control function unit 24 of the device 2 sets link information of the line 2-*a* as link up in the extension header information, and transmits to the device 3. The link control function unit 34 of the device 3 obtains link up information of the line 2-*a* from the transmitted extension header information. As such, the link control function unit 34 of the device 3 links up the line terminal 3-A to be link up, and links up the line 3-*a* connecting the device 3 and the device 4.

Next, an operation when a link disconnection occurs in the inter-device interface L8 connecting the devices 2 and 3 will be described. When the load balancing function units 25 and 35 of the devices 2 and 3 detect that a link disconnection occurs in the inter-device interface L8, the load balancing function units 25 and 35 perform processing according to the states of the lower stage line terminals 2-E and 3-E.

If the lower stage line terminals 2-E and 3-E are in a link down state, as load balancing cannot be performed, all of the line terminals 2-A to 2-D and 3-A to 3-D are forcibly closed. Then, when the inter-device interface L8 is recovered, all of the line terminals 2-A to 2-D and 3-A to 3-D are linked up. On the other hand, if the lower stage line terminals 2-E and 3-E are in a link up state, the load balancing function units 25 and 35 input all of the Ethernet frames input via the line terminals 2-A to 2-D and 3-A to 3-D to the lower stage line terminals 2-E and 3-E. Then, when the inter-device interface L8 is recovered, the load balancing function units 25 and 35 divide and output the Ethernet frames to the inter-device interface L8 and the lower stage line terminals 2-E and 3-E.

Next, first to third operation modes will be described.
(1) First Operation Mode First operation mode is a mode for performing setting of link information and link control for each of the lines. More specifically, the first operation mode is a mode in which setting of link information (link up, link down) in extension header information is performed for each line, and link control (link up, forcible closure) when extension header information is received from the counterpart device is performed for each line terminal of the self device in accordance with the link information of the line of the counterpart device which is previously set with respect to (associated with) the line terminal. An example of setting of the self device side in the configuration shown in FIG. 1, in the case where the device 2 is the self device and the device 3 is the counterpart device, will be described below.

Example 1

If link information of the counterpart device 3 corresponding to the line terminal 2-A is set to the line 3-*a*, link control of the line terminal 2-A is performed based on the link information of the line 3-*a*. This setting is performed on the line terminal which transmits and receives Ethernet frames with one particular line of the counterpart device 3.

Example 2

If link information of the counterpart device 3 corresponding to the line terminal 2-A is set to the line 3-*d*, link control of the line terminal 2-A is performed based on the link information of the line 3-*d*.

Example 3

If line link information of the counterpart device 3 corresponding to the line terminal 2-A is set to "the line 3-*a* and the line 3-*d*", link control of the line terminal 2-A is performed based on the logical multiplication of the link information of the line 3-*a* and the link information of the line 3-*d*. This setting is performed on a line terminal which may transmit and receive Ethernet frames with any of a plurality of particular lines of the counterpart device 3.

Example 4

If link information of the counterpart device 3 corresponding to the line terminal 2-A is set to "the line 3-*a* or the line 3-*b*", link control of the line terminal 2-A is performed based on the logical multiplication of the link information of the line 3-*a* and the link information of the line 3-*b*. This setting is performed on a line terminal which needs to transmit and receive Ethernet frames with all of a plurality of particular lines of the counterpart device 3.

In the above Example 3 and Example 4, while the number of lines of the counterpart device to be set with respect to a line terminal of the self device is two lines, the number of lines is not limited to this number and may be set freely. However, the maximum number is the number of lines to be transmitted by extension header information.
(2) Second Operation Mode A second operation mode is a mode for performing setting of link information and link control for all of the lines, according to a link state of one line. More specifically, in the second operation mode, setting of link information in extension header information is performed such that if there is any line in a link disconnection state in the self device 2, all of the lines are set as link down. Further, when extension header information is received from the counterpart device 3, if there is any line in a link disconnection state in the counterpart device 3, all of the line terminals of the self device 2 are forcibly closed, and only when all of the lines are in an link up state, all of the line terminals are allowed to be in a link up state. With use of the second operation mode, even in a network system in which the line terminals of the self device for outputting Ethernet frames, input from the respective line terminals of the counterpart device, are not determined, it is possible to perform link loss forwarding.
(3) Third Operation Mode A third operation mode is a mode for performing setting of link information and link control for all of the lines, according to the link states of all of the lines. More specifically, in the third operation mode, setting of link information in extension header information is performed such that only when all of the lines of the self device 2 are in a link disconnection state, all of the lines are set as link down. Further, when extension header information is received from the counterpart device 3, only when all of the link states of the counterpart device 3 are link disconnection, all of the line terminals of the self device 2 are forcibly closed. If at least one piece of information indicating a link up state is received from the counterpart device 3, all of the line terminals of the self device 2 are allowed to be in a link up state. With use of the third operation mode, even in a network system in which Ethernet frames transmitted from the counterpart device can be output from any line terminals of the self device, it is possible to perform link loss forwarding.

Figure 4:
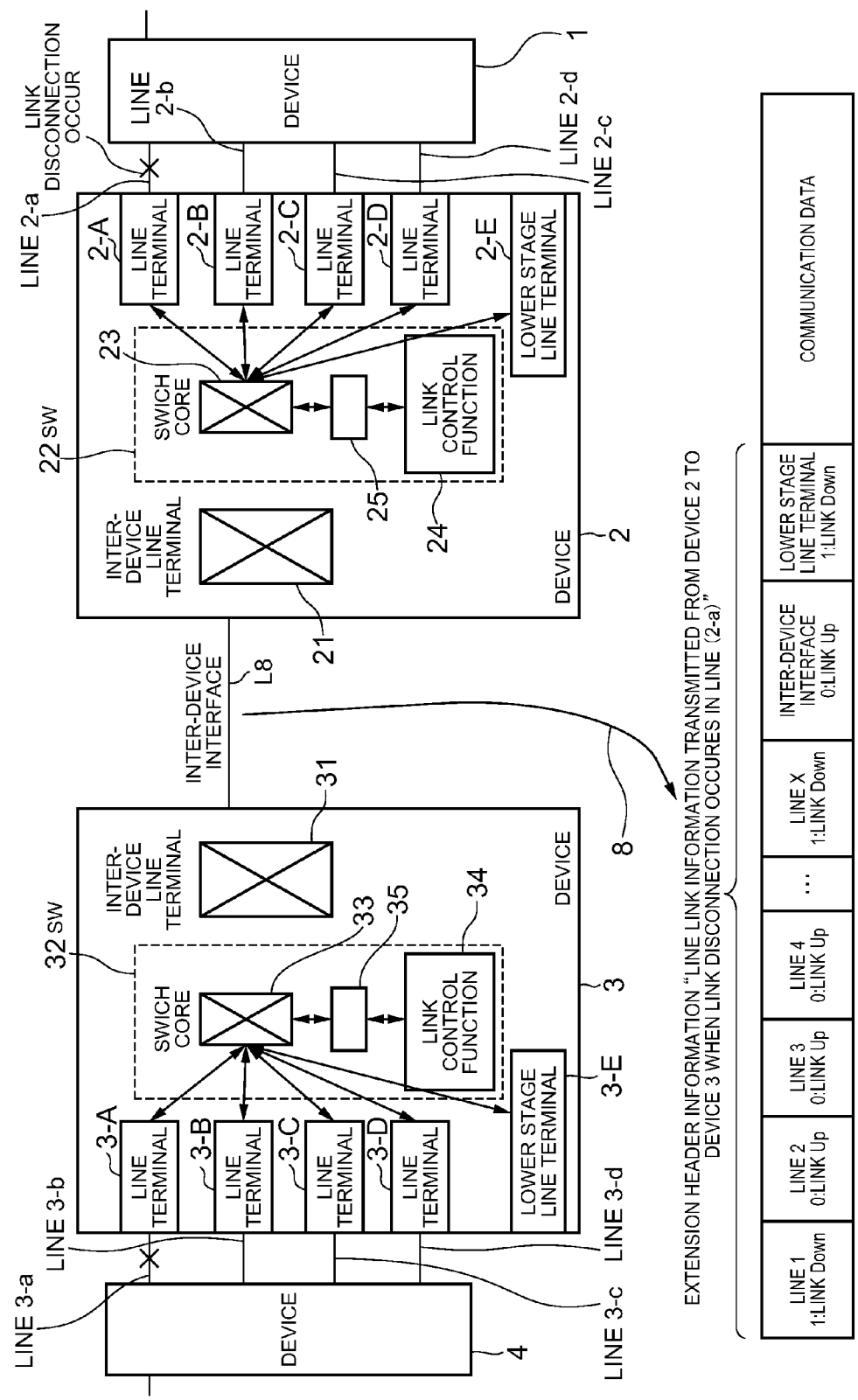
FIG. 4 is a diagram for illustrating a first operation mode.
Figure 5:
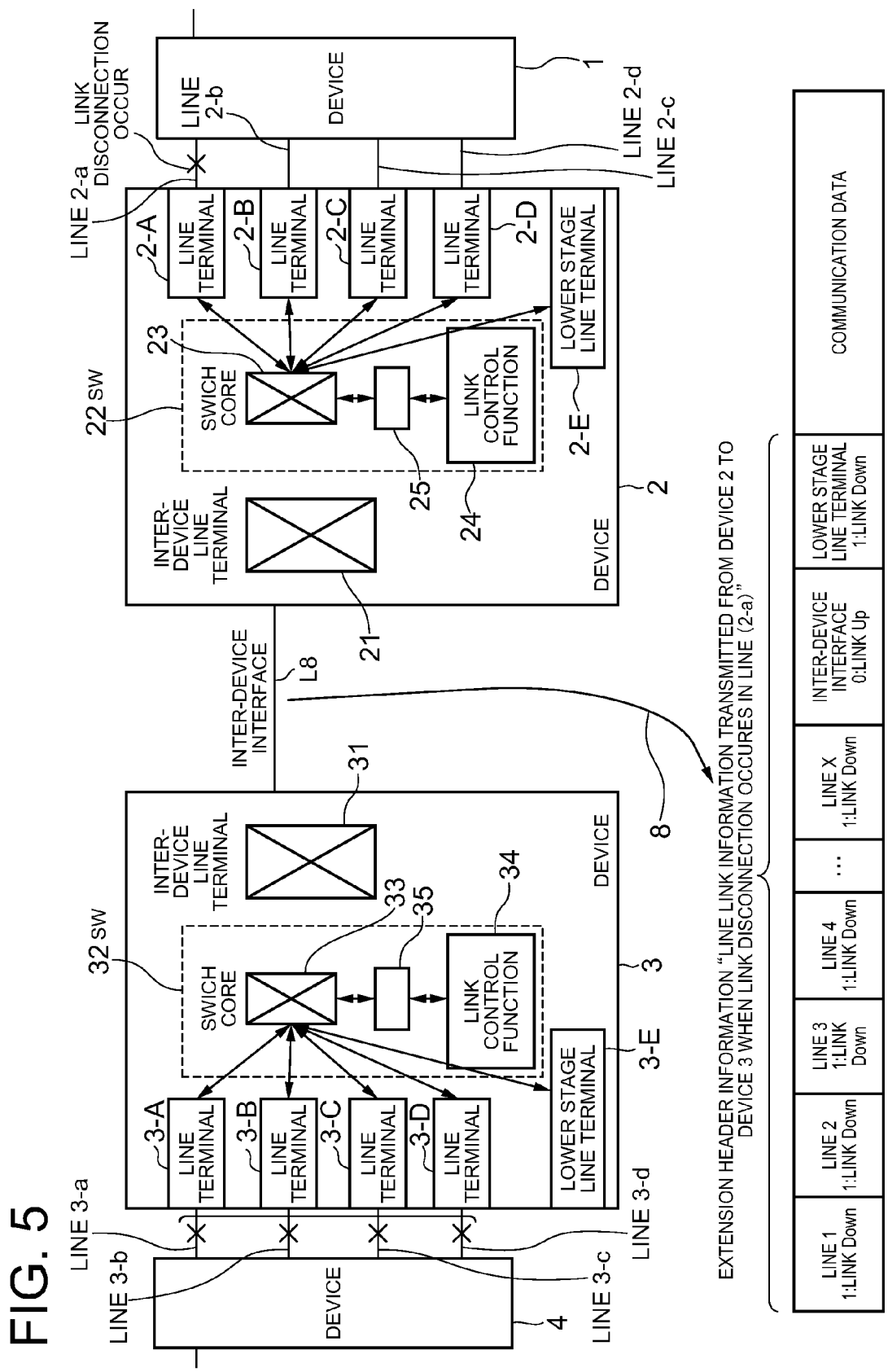
FIG. 5 is a diagram for illustrating a second operation mode.
Figure 6:
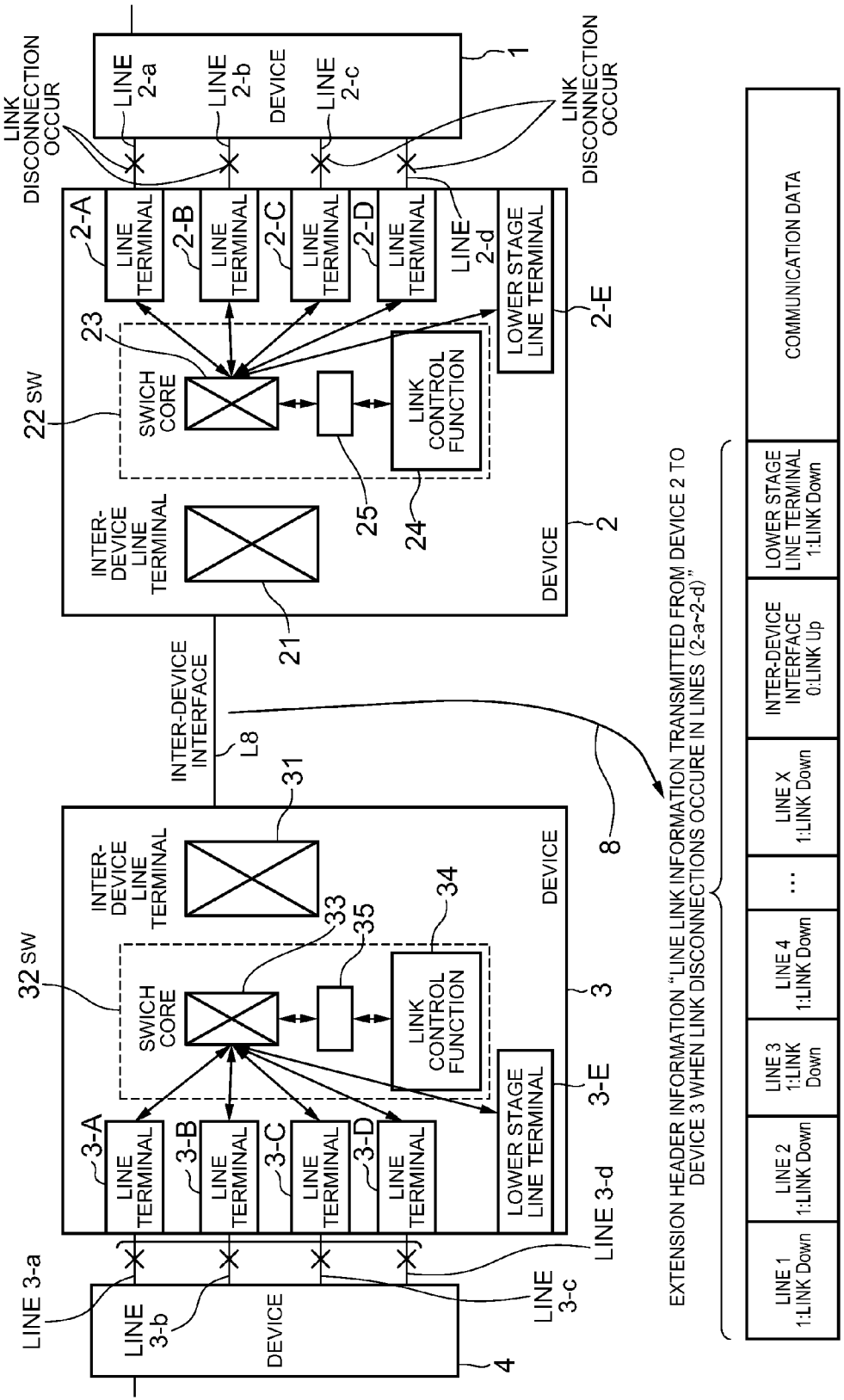
FIG. 6 is a diagram for illustrating a third operation mode.

With reference to FIGS. 4 to 6, a link loss forwarding operation in each of the first to third operation modes will be described.

FIG. 4 is a diagram for illustrating a link loss forwarding operation performed in the devices 2 and 3 in the case of a first operation mode.

When a link disconnection occurs in the line 2-*a* of the device 2, the link control function unit 24 of the device 2 detects the link disconnection in the line 2-*a*, sets link information 8 of the line 2-*a* as link down in the extension header information, and transmits it to the device 3. The link control function unit 34 of the device 3 recognizes the link down of the line 2-*a* from the extension header information. Thereby, in accordance with the predetermined correspondence relation, the link control function unit 34 of the device 3 forcibly closes only the line terminal 3-A to disconnect the link of the line 3-*a* connecting with the device 4, for example. It should be noted that as the link disconnection of the line 3-*a* is due to forcible closure of the line terminal 3-A, in order to prevent occurrence of a deadlock, link information of the line 3-*a* notified to the counterpart device 2 is set as link up.

When the link of the line 2-*a* is recovered, the link control function unit 24 of the device 2 sets link information of the line 2-*a* as link up in the extension header information, and transmits it to the device 3. The link control function unit 34 of the device 3 recognizes link up of the line 2-*a*. Thereby, the link control function unit 34 of the device 3 links up the line terminal 3-A and links up the line 3-*a* connecting with the device 4.

FIG. 5 is a diagram for illustrating a link loss forwarding operation performed in the devices 2 and 3 in the case of a second operation mode.

When a link disconnection occurs in the line 2-*a* of the device 2, the link control function unit 24 of the device 2 detects the link disconnection in the line 2-*a*, sets link information 8 of all of the lines 2-*a* to 2-*d* as link down in the extension header information, and transmits it to the device 3. The link control function unit 34 of the device 3 recognizes link down of one or more lines from the extension header information. Thereby, the link control function unit 34 of the device 3 forcibly closes the line terminals 3-A to 3-D and disconnects links of all of the lines 3-*a* to 3-*d* connecting with the device 4.

When the link of the line 2-*a* is recovered, the link control function unit 24 of the device 2 sets link information of the lines 2-*a* to 2-*d* as link up in the extension header information, and transmits it to the device 3. The link control function unit 34 of the device 3 recognizes link up of all of the lines. Thereby, the link control function unit 34 of the device 3 links up the line terminals 3-A to 3-D and links up all of the lines 3-*a* to 3-*d* connecting with the device 4.

FIG. 6 is a diagram for illustrating a link loss forwarding operation performed in the devices 2 and 3 in the case of a third operation mode.

The link control function unit 24 of the device 2 sets link down of all of the lines in the extension header information only when all of the lines are in a link down state. Similarly, the link control function unit 34 of the device 3 sets link down of all of the lines in the extension header information only when all of the lines are in a link down state.

When link disconnections occur in the lines 2-*a* to 2-*d* of the device 2, the link control function unit 24 of the device 2 detects the link disconnections in all of the lines, sets link information 8 of all of the lines as link down in the extension header information, and transmits it to the device 3. The link control function unit 34 of the device 3 recognizes the link down of all of the lines from the extension header information. Thereby, the link control function unit 34 of the device 3 forcibly closes the line terminals 3-A to 3-D and disconnects links of all of the lines 3-*a* to 3-*d* connecting with the device 4.

When the link of at least one of the lines 2-*a* to 2-*d* is recovered, the link control function unit 24 of the device 2 sets link information of all of the lines as link up in the extension header information, and transmits it to the device 3. The link control function unit 34 of the device 3 recognizes that there is at least one piece of link information in a link up state. Thereby, the link control function unit 34 of the device 3 links up all of the line terminals 3-A to 3-D and links up all of the lines 3-*a* to 3-*d* connecting with the device 4.

With the above system, by transmitting link states of the lines with a small amount of information namely extension header information of an inter-device interface and performing an operation for each mode set in each device, link loss forwarding can be realized independently between the devices.

While link loss forwarding in the base configuration is as described above, link loss forwarding in the case of connecting the base configurations in multiple stages will be described with reference to FIG. 7. Hereinafter, an operation performed by a link control function unit or a load balancing function unit of each device may be described as an operation of each device.

Figure 7:
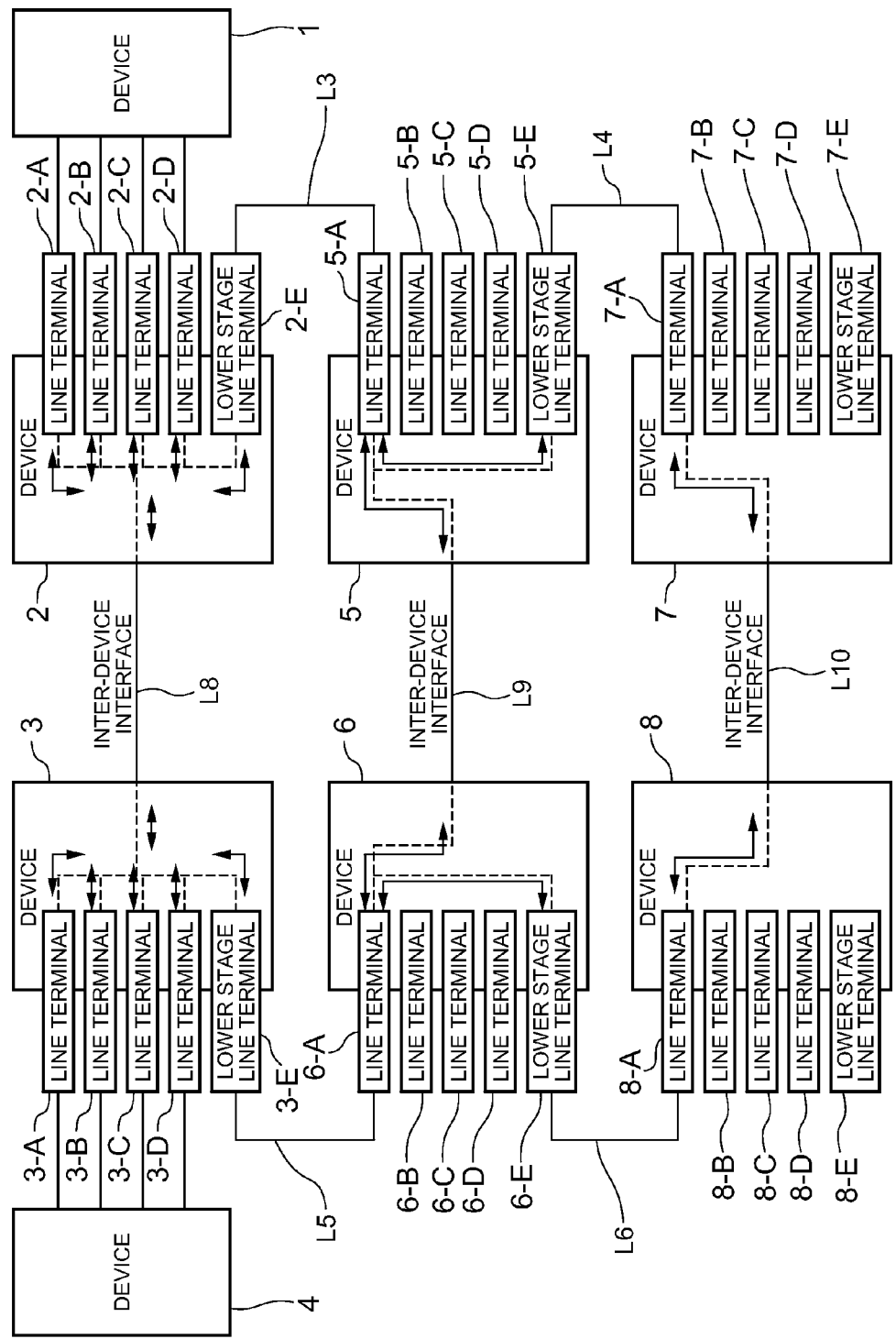
FIG. 7 is a diagram showing an exemplary configuration of the first exemplary embodiment according to the present invention.

In FIG. 7, the device 2, the device 5, and the device 7 are connected in multiple stages. Further, the device 3, the device 6, and the device 8 are also connected in multiple stages, similarly. A line L3 is a line connecting the lower stage line terminal 2-E of the device 2 and a line terminal 5-A of the device 5 which is a lower stage device. A line L4 is a line connecting the lower stage line terminal 5-E of the device 5 which is a lower stage device and a line terminal 7-A of the device 7 which is a further lower stage device. Lines L5 and L6 are lines connecting the device 3, the device 6, and the device 8 in multiple stages in a similar manner. A line L8 is an inter-device interface connecting the device 2 and the device 3. A line L9 is an inter-device interface connecting the device 5 and the device 6. A line L10 is an inter-device interface connecting the device 7 and the device 8.

The reason for connecting the base configurations in multiple stages as shown in FIG. 7 is to prevent frame from being discarded even if the inter-device interface of the line L8 is a low capacity line. The device 2 distributes the frames received from the device 1 to the line L8 and the line L3 for load balancing. The lower stage line terminal is a communication port to be used for load balancing to the device connected in the lower stage. Similarly, the lower device 5 also distributes the frames received from the device 2 to the line L9 and the line L4 for load balancing. In the device 7 connected in a further lower stage, as no line is connected to the lower stage line terminal 7-E, the device 7 transmits all of the frames received from the device 5 to the line L10. The device 8 transmits the frames received from the device 7 to the device 6 in an upper stage, and the device 6 transmits the frames received from the device 5 and the device 8 to the device 3 in an upper stage. The device 3 transmits the frames received from the device 2 and the device 6 to the device 4. Load balancing of the frames transmitted in an opposite direction from the device 4 to the device 3 is performed similarly.

Figure 8:
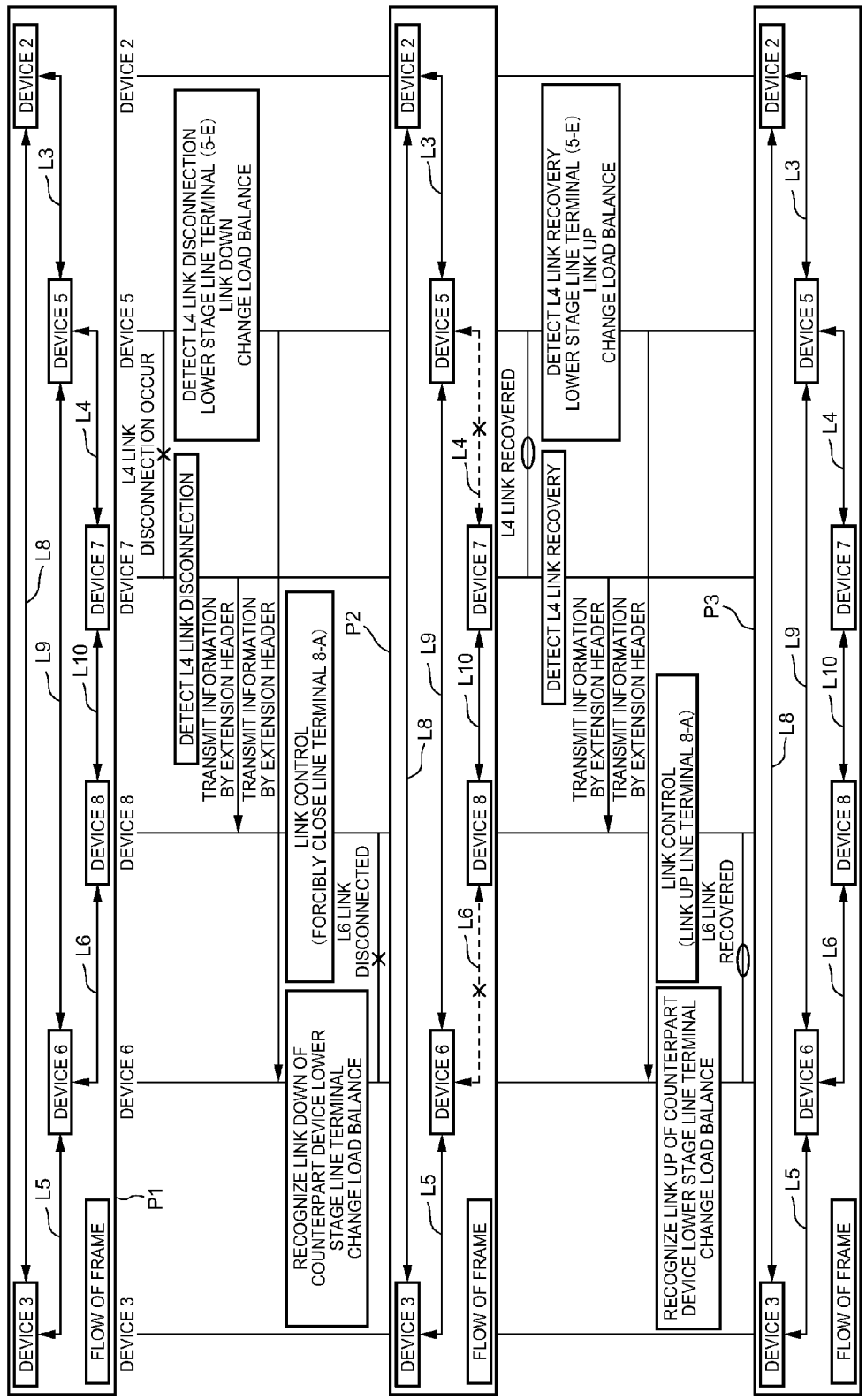
FIG. 8 is a diagram for illustrating operations when link disconnections occur and links are recovered in lines connecting devices in multiple stages.

In the multiple stage configuration of FIG. 7, a link loss forwarding operation when a link disconnection occurs in the line L4 and when the link is recovered will be described with reference to the sequence chart of FIG. 8. FIG. 8 is a sequence chart illustrating a link loss forwarding operation of each device in the multiple-stage configuration and transmission of extension header information, in which the time axis is taken from top to bottom. P1, P2, and P3 indicate flows of frame transfer in the states of respective time axes.

When a link disconnection occurs in the line L4, the link control function unit of the device 7 sets link down of the line L4 in extension header information, and transmits it to the device 8. The link control function unit of the device 8 recognizes link down of the line L4 of the counterpart device 7, forcibly closes a line terminal 8-A, and causes a link disconnection in the line L6. Thereby, the device 7 and the device 8 in the lowest stage are separated from the multiple-stage configuration. At this moment, the link control function unit of the device 5 also sets the link information of the lower stage line terminal 5-E as link down due to the link disconnection in the line L4, and transmits it to the device 6. Thereby, while the link control function unit of the device 6 recognizes down of the line L4 of the counterpart device 5, the link control function unit does not forcibly close the lower stage line terminal 6-E in the self device 6. On the other hand, the load balancing function units of the devices 5 and 6 change the road balancing routes because the respective lower stage devices 7 and 8 are not connected any more, do not transmit the frames from the upper stage devices (devices 2 and 3) to the lower stage devices (devices 7 and 8), and transmit all of the received frames to the counterpart devices via the inter-device interface (line L9). It should be noted that while, after the link of the line L6 is disconnected, the device 6 transmits to the counterpart device 5 an Ethernet frame containing extension header information in which the link information of the line L6 is link down, the lower stage line terminal 5-E is never closed forcibly in the counterpart device 5. As described above, by not closing the lower stage line terminals 5-E and 6-E forcibly, it is possible to prevent occurrence of a deadlock when the link is recovered in the line L4.

When the link is recovered in the line L4, the link control function unit of the device 7 sets the link information of the line L4 as link up in the extension header information, and transmits it to the device 8. The link control function unit of the device 8 recognizes link up of the line L4, links up the line terminal 8-A, and links up the line L6. At this moment, the link control function unit of the device 5 also sets link information of the lower stage line terminal 5-E as link up because of link recovery in the line L4, and transmits it to the device 6. The load balancing function unit of the device 8 recognizes link up of the lower stage line terminal of the counterpart device 5. Thereby, the device 7 and the device 8 are incorporated in the multiple-stage configuration. As the respective lower stage devices 7 and 8 exist, the devices 5 and 6 change the load balancing, and transmit the frames to the lower stage devices.

Figure 9:
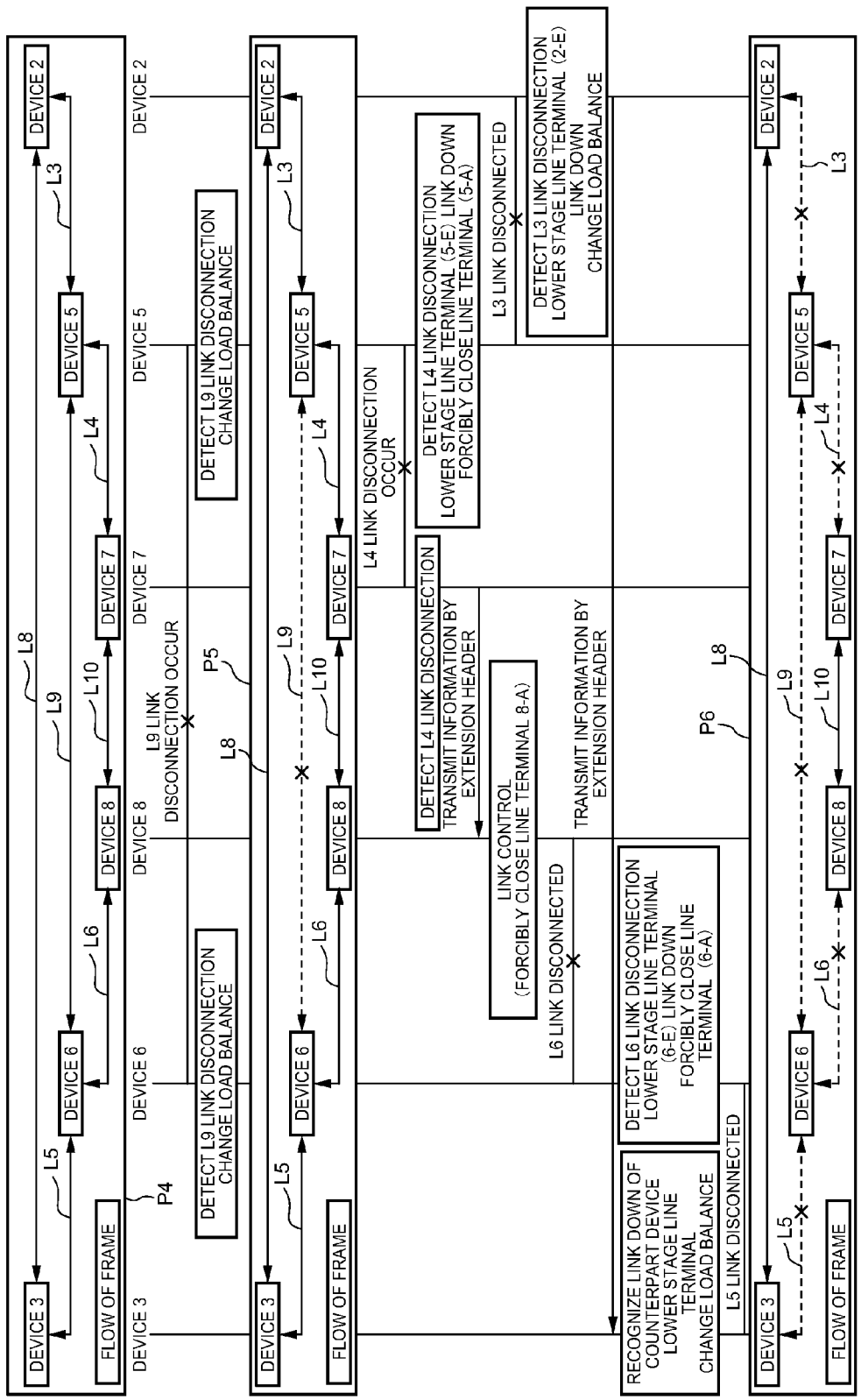
FIG. 9 is a diagram for illustrating operations when link disconnections occur in lines and inter-device interfaces connecting devices in multiple stages.

FIG. 9 is a sequence chart showing a link loss forwarding operation in the case where a link disconnection occurs in the line L9 and the case where another link disconnection occurs in the line L4, in the multiple-stage configuration shown in FIG. 7. P4, P5, and P6 indicate flows of frame transfer in the states of respective time axes.

When a link disconnection occurs in the inter-device interface of the line L9, if the lower stage line terminals 5-E and 6-E are in a link up state, the load balancing function units of the devices 5 and 6 do not close all of the line terminals. As the lower stage line terminal 5-E is link up, the load balancing function unit of the device 5 does not forcibly close the line terminal 5-A, and only changes the transmission port of load balancing. Specifically, the load balancing function unit stops transmission to the inter-device interface (line L9) and transfers all of the frames received from the device 2 to the device 7. The same operation is performed in the counterpart device 6 of the device 5.

Now, if another link disconnection occurs in the line L4, the device 7 detects that the line L4 is in a link down state, and the device 5 detects link down of the lower stage line terminal 5-E, in a similar manner as in the above description of the FIG. 8. The counterpart device 8 of the device 7 recognizes that the line L4 is link down from the extension header information, forcibly closes the line terminal 8-A, and disconnects the link of the line L6. As the link of the line L6 is disconnected, the device 6 detects that the lower stage line terminal 6-E is link down. As the lower stage line terminals 5-E and 6-E are link down, the device 5 and the device 6 separate the device 7 and the device 8 from the multiple-stage configuration. Consequently, in both the device 5 and the device 6, as the inter-device interface (line L9) and the lower stage line terminals 5-E and 6-E are link down, the device 5 forcibly closes the line terminal 5-A and the device 6 forcibly closes the line terminal 6-A. The device 2 detects that the link is disconnected in the line L3, sets the link information of the lower stage line terminal 2-E as link down, transmits it in extension header information to the device 3, and changes the load balance. The device 3 recognizes that the lower stage line terminal of the counterpart device is link down from the extension header information, and changes the load balance. Thereby, the device 5 and the device 6 are separated from the multiple-stage configuration. Through these changes in the load balance, the device 2 and the device 3 do not transmit the frames to the lower stage devices, and transmit all of the received frames to the counterpart devices via the inter-device interface (line L8).

Figure 10:
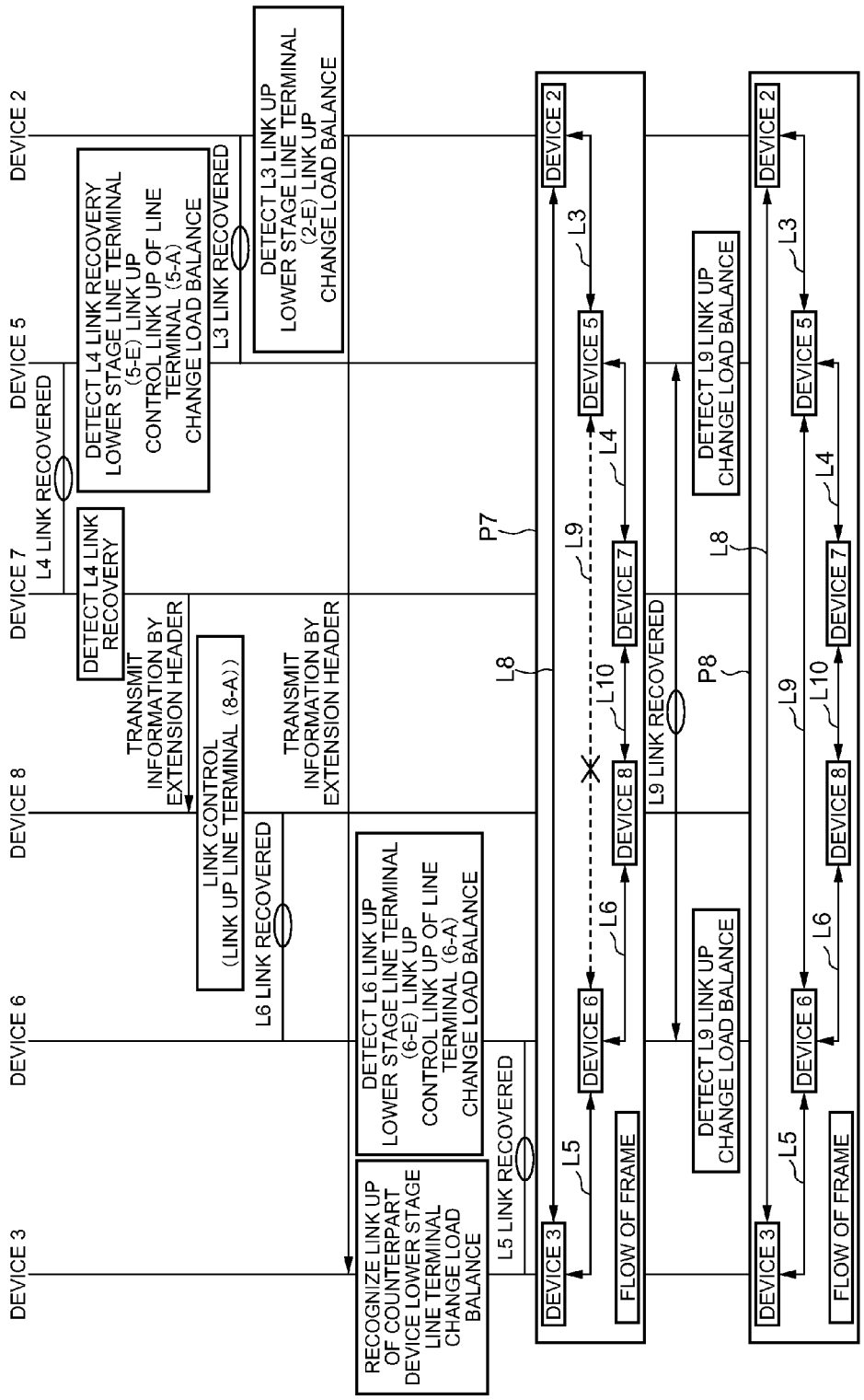
FIG. 10 is a diagram for illustrating operations when links are recovered in lines and inter-device interfaces connecting devices in multiple stages.

Next, with reference to FIG. 10, description will be given on a link loss forwarding operation in the case where the link of the line L4 is recovered and the case where the link of the line L9 is also recovered after the sequence of FIG. 9, in the multiple-stage configuration shown in FIG. 7. P7 and P8 indicate flows of frame transfer in the states of respective time axes.

When the line L4 is recovered, the device 7 sets the link information of the line L4 as link up in the extension header information, and transmits it to the device 8. The device 8 recognizes link up of the line L4 from the extension header information. The device 8 links up the line terminal 8-A from a forcible closure state and links up the line L6. As the lower stage line terminal 5-E and 6-E connected with the lower stage devices are linked up, the device 5 and the device 6 link up the line terminals 5-A and 6-A from a forcible closure state, and link up the line L3 and the line L5. The device 2 detects that the line L3 is link up, sets the state of the lower stage line terminal 2-E as link up in the extension header information, and transmits it to the device 3. The device 3 recognizes link up of the lower stage line terminal of the counterpart device 2 from the extension header information, and changes the load balance. Thereby, the devices 5 to 8 are incorporated in the multiple-stage configuration, and load balancing using the lines L8 and L10 can be realized.

If the link of the inter-device interface of the line L9 is recovered from this state, when the device 5 and the device 6 recognize link up of the line L9, the device 5 and the device 6 change the routes of the load balancing, and transmit the frames to the line L9 as well.

In this way, as the present embodiment has a configuration in which the devices are connected in multiple stages, load balancing can be performed by link loss forwarding even if a failure occurs in any line. Even in the case where a plurality of failures occur, presence of load balancing destinations is determined according to link states of inter-device interfaces and lower stage line terminals, whereby separation and incorporation to and from the multiple-stage configuration are realized.

It should be noted that while a three-stage configuration is described as an example in the present embodiment, the number of stages is not limited and is extendable. Further, while the number of line terminals is four in the present embodiment, as such a number depends on the free band of an inter-device interface, the number of lines is not limited and is extendable.

Effects of First Exemplary Embodiment

According to the present embodiment, in a network system in which network devices, arranged opposite each other, are connected in multiple stages so as to provide redundant inter-device interfaces connecting the devices arranged opposite each other, it is possible to perform link loss forwarding without causing a deadlock on the following grounds. A line in which a link disconnection occurs, among the lines terminated at the line terminals 2-A to 2-D or the line L3 terminated at the lower stage line terminal 2-E of the self device 2, and the cause of the occurrence of the link disconnection is not a forcible closure of the line terminals 2-A to 2-D of the self device, is notified to the counterpart device 3, while a line in which a link disconnection occurs due to a forcible closure of the line terminals 2-A to 2-D of the self device 2 is not notified to the counterpart device 3. As such, a deadlock will never be caused even when the link is recovered in the line between the self device 2 and the subsequent device 1. Further, if a line in which a link disconnection occurs, notified from the counterpart device 3, is the line L5 terminated at the lower stage line terminal 3-E of the counterpart device 3, as the lower stage line terminal of the self device 2 is not forcibly closed, a deadlock will never be caused even when the link is recovered in the line L3 between the devices 2 and 5.

Further, as the present embodiment includes a load balancing function unit which determines load balancing destinations of Ethernet frames from the upper device 2 in accordance with the states of the lower stage line terminal 5-E of the self device 5 and the inter-device interface L9, communications can be continued even if a failure occurs.

Further, in the present embodiment, as link information of the respective lines 2-*a* to 2-*d* terminated at the line terminals 2-A to 2-D of the self device 2, required for performing link loss forwarding, is set in the header section of an Ethernet frame to be transmitted to the counterpart device 3 and is transmitted to the counterpart device 3, a bandwidth can be used effectively.

Moreover, in the present embodiment, if there is at least one line in which a link disconnection occurs among the lines 2-*a* to 2-*d* terminated at the line terminals 2-A to 2-D of the self device, link information of each of the lines 2-*a* to 2-*d* terminated at the line terminals 2-A to 2-D of the self device 2, which is set in the header section of the Ethernet frame 8, is set as link down, and only when the link information of all of the lines 3-*a* to 3-*d* terminated at the line terminals 3-A to 3-D of the counterpart device 3, set in the Ethernet frame transmitted from the counterpart device 3, is link down, all of the line terminals 2-A to 2-D of the self device 2 are forcibly closed. As such, even in a network system in which line terminals of the self device for outputting Ethernet frames, input from the respective line terminals 3-A to 3-D of the counterpart device 3, are not determined, link loss forwarding can be performed.

Further, in the present embodiment, only when link disconnections occur in all of the lines 2-*a* to 2-*d* terminated at the line terminals 2-A to 2-D of the self device 2, link information of each of the lines 2-*a* to 2-*d* terminated at the line terminals 2-A to 2-D of the self device 2, set in the header section of the Ethernet frame 8, is set as link down, and only when the link information of each of the lines 3-*a* to 3-*d* terminated at the line terminals 3-A to 3-E of the counterpart device 3, set in the Ethernet frame transmitted from the counterpart device 3, is link down, all of the line terminals 2-A to 2-D of the self device 2 are forcibly closed. As such, even in a network system in which Ethernet frames transmitted from the counterpart device 3 may be output from any line terminals of the self device 2, link loss forwarding can be performed.

Second Exemplary Embodiment

Figure 11:
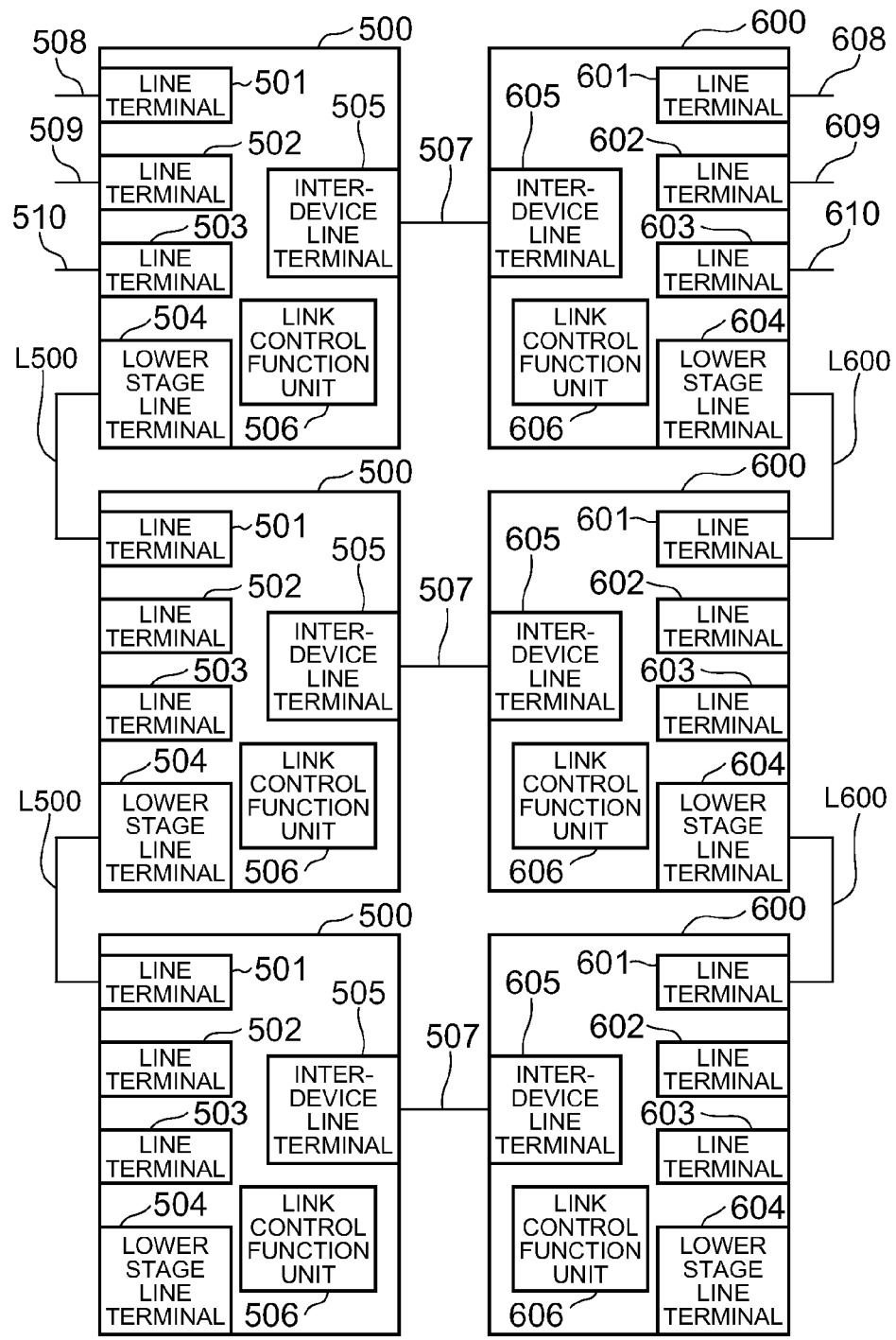
FIG. 11 is a block diagram showing an exemplary configuration of a second exemplary embodiment of the present invention.
Figure 12:
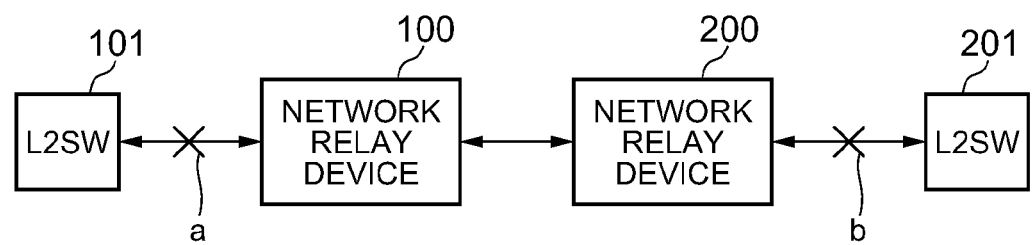
FIG. 12 is a diagram for illustrating a problem to be caused when link loss forwarding is performed.
Figure 13:
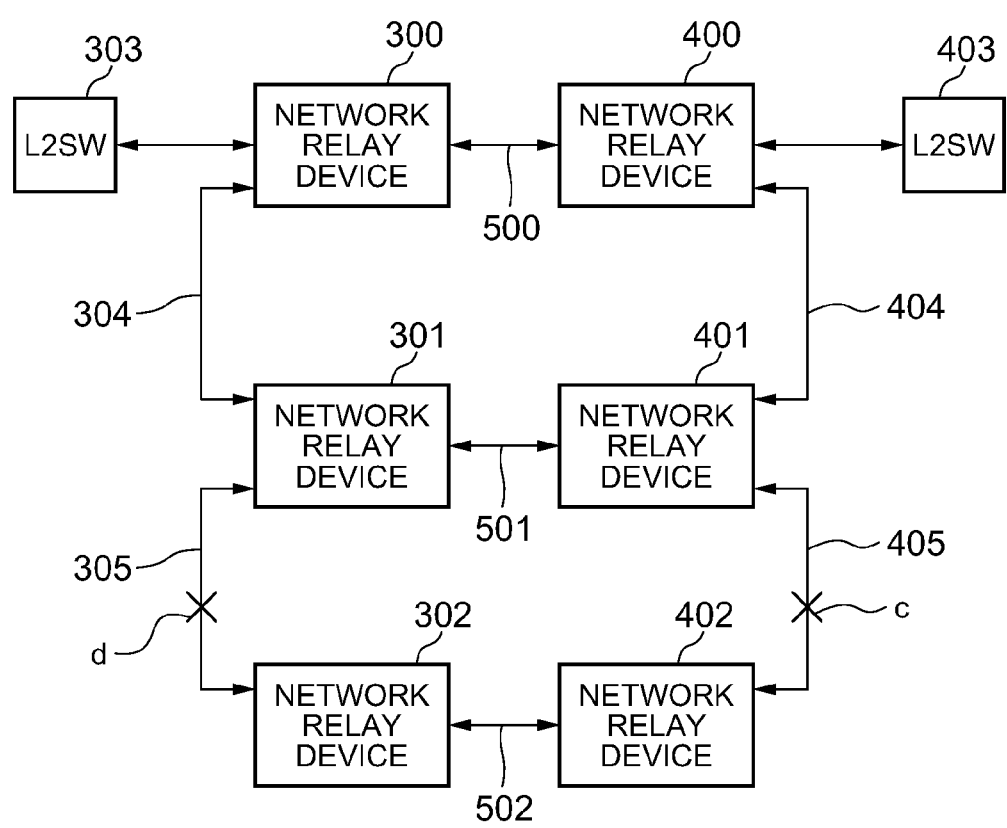
FIG. 13 is a diagram for illustrating a problem to be caused when link loss forwarding is performed in a network system in which pairs of network relay devices are connected in multiple stages.

Referring to FIG. 11, a network system according to a second exemplary embodiment of the present invention is configured such that first and second devices 500 and 600, having a plurality of line terminals 501 to 503 and 601 to 603, lower stage line terminals 504 and 604, and inter-device line terminals 505 and 605, are arranged opposite each other, the inter-device line terminals 505 and 605 of the first and second devices 500 and 600, arranged opposite each other, are connected by an inter-device interface 507 to thereby form a pair of devices and the pairs of devices are arranged in multiple stages. The lower stage line terminal 504 of a first device 500 arranged on the upper side and one line terminal (line terminal 501) of a first device arranged on the lower side, in adjacent stages, are connected by a line L500, and the lower stage line terminal 604 of a second device 600 arranged on the upper side and one line terminal (line terminal 601) of a second device arranged on the lower side, in adjacent stages, are connected by a line L600. A link control function unit 506 of the device 500 notifies a counterpart device 600 of a line in which a link disconnection occurs among lines 508 to 510 and L500 terminated at line terminals 501 to 503 or the lower stage line terminal 504 of the self device 500 and the cause of the occurrence of the link disconnection is not a forcible closure of a line terminal of the self device 500. Further, if a line in which a link disconnection occurs, notified from the counterpart device 600, is any of the lines 608 to 610 other than the line L 600 terminated at the lower stage line terminal 604 of the counterpart device 600, the link control function unit 506 forcibly closes a line terminal of the self device associated with the line in which the link disconnection occurs, while if a line in which a link disconnection occurs, notified from the counterpart device 600, is the line terminated at the lower stage line terminal 604 of the counterpart device 600, the link control function unit 506 does not forcibly close the lower stage line terminal 504 of the self device 500.

According to this configuration, in a network system in which network devices, arranged opposite each other, are connected in multiple stages to realize redundant inter-device interfaces connecting the devices arranged opposite each other, it is possible to perform link loss forwarding without causing a deadlock on the following grounds. A line in which a link disconnection occurs, among the lines 608 to 610 and L3 terminated at the line terminals 501 to 503 or the lower stage line terminal 504 of the self device 500, and the cause of the occurrence of the link disconnection is not a forcible closure of the line terminals 601 to 603 of the self device, is notified to the counterpart device 600, while a line in which a link disconnection occurs due to a forcible closure of the line terminals 601 to 603 of the self device 500 is not notified to the counterpart device 600. As such, a deadlock will never be caused even when the link is recovered in the lines 608 to 610 between the self device 500 and the subsequent device. Further, if a line in which a link disconnection occurs, notified from the counterpart device 600, is the line L600 terminated at the lower stage line terminal 604 of the counterpart device 600, as the lower stage line terminal 504 of the self device 500 is not forcibly closed, a deadlock will never be caused even when the link is recovered in the line 507 between the devices 500 and 600.

In this embodiment, it is preferable that the link control function unit is configured to notify the counterpart device of a line in which link is recovered among the lines terminated at the line terminals or the lower stage line terminal of the self device, and when being notified from the counterpart device of a line in which link is recovered, link up a line terminal or the lower stage line terminal of the self device associated with the line in which the link is recovered.

Further, in the above network system, it is preferable that each of the devices includes a load balancing function unit which, if both the line terminated at the lower stage line terminal of the self device and an inter-device interface terminated at the inter-device line terminal of the self device are normal, outputs frames input via line terminals of the self device to the inter device line terminal of the self device and to the lower stage line terminal of the self device in a distributive manner at a predetermined ratio, if a link disconnection occurs in the line terminated at the lower stage line terminal of the self device, outputs all frames input via line terminals of the self device to the inter-device line terminal of the self device, if a link disconnection occurs in the inter-device interface terminated at the inter-device line terminal of the self device, outputs all frames input via line terminals of the self device to the lower stage line terminal of the self device, and if a line in which a link disconnection occurs, notified from the counterpart device, is the line terminated at the lower stage line terminal of the counterpart device, outputs all frames input via line terminals of the self device to the inter-device line terminal of the self device.

With this configuration, as the load balancing function unit determines load balancing destinations of frames transmitted from the upper device in accordance with the states of the lower stage line terminal of the self device and the inter-device interface, communications can be continued even if a failure occurs.

Further, it is preferable that the load balancing function unit is configured such that when being notified from the counterpart device of the line terminated at the lower stage line terminal of the counterpart device as a line in which link is recovered, the load balancing function unit outputs frames input via line terminals of the self device to the inter-device line terminal of the self device and to the lower stage line terminal of the self device in a distributive manner at a predetermined ratio.

Further, it is preferable that the link control function unit is configured to set, in a header section of a frame to be transmitted to the counterpart device, link information indicating a state of each line terminated at each of the line terminals of the self device and link information indicating a state of the line terminated at the lower stage line terminal of the self device, to notify the counterpart device of a line in which a link disconnection occurs among the lines terminated at the line terminals or the lower stage line terminal of the self device and the cause of the occurrence of the link disconnection is not a forcible closure of a line terminal of the self device. With this configuration, a bandwidth can be used effectively.

Further, the link control function unit may be configured such that if there is at least one line in which a link disconnection occurs among the lines terminated at the line terminals of the self device, the link control function unit sets, in the header section of the frame, the link information of each line terminated at each of the line terminals of the self device as link down, and only when all pieces of link information of the respective lines terminated at the line terminals of the counterpart device, set in a frame transmitted from the counterpart device, indicate link down, the link control function unit forcibly closes all of the line terminals of the self device.

With this configuration, it is possible to perform link loss forwarding even in a system in which line terminals of the self device for outputting frames, input from the respective line terminals of the counterpart device 3, are not determined.

Further, the link control function unit may be configured such that only when link disconnections occur in all of the lines terminated at the line terminals of the self device, the link control function unit sets link information, in the header section of the frame, of each line terminated at each of the line terminals of the self device as link down, and only when the link information of each line terminated at each of the line terminals of the counterpart device, set in a frame transmitted from the counterpart device, indicates link down, the link control function unit forcibly closes all of the line terminals of the self device.

With this configuration, it is possible to perform link loss forwarding even in a system in which frames transmitted from the counterpart device may be output from any line terminals of the self device.

Further, a network device, which is another aspect of the present invention, includes a plurality of line terminals, a lower stage line terminal, and an inter-device line terminal. The network device also includes a link control function unit which notifies a counterpart network device, via an inter-device interface terminated at the inter-device line terminal, of a line in which a link disconnection occurs among lines terminated at the line terminals or the lower stage line terminal of the self network device and the cause of the occurrence of the link disconnection is not a forcible closure of a line terminal of the self network device, and if a line in which a link disconnection occurs, notified from the counterpart network device, is a line other than the line terminated at the lower stage line terminal of the counterpart network device, forcibly closes a line terminal of the self network device associated with the line in which the link disconnection occurs notified from the counterpart network device, while if a line in which a link disconnection occurs, notified from the counterpart network device, is the line terminated at the lower stage line terminal of the counterpart network device, does not forcibly close the lower stage line terminal of the self network device.

In this aspect, it is preferable that the link control function unit is configured to notify the counterpart network device of a line in which link is recovered among the lines terminated at the line terminals or the lower stage line terminal of the self network device, and when being notified from the counterpart network device of a line in which link is recovered, link up a line terminal or the lower stage line terminal of the self network device associated with the line in which the link is recovered.

Further, it is also preferable that the network device further includes a load balancing function unit which, if both the line terminated at the lower stage line terminal of the self network device and the inter-device interface terminated at the inter-device line terminal of the self network device are normal, outputs frames input via line terminals of the self network device to the inter-device line terminal of the self network device and to the lower stage line terminal of the self network device in a distributive manner at a predetermined ratio, if a link disconnection occurs in the line terminated at the lower stage line terminal of the self network device, outputs all frames input via line terminals of the self network device to the inter-device line terminal of the self network device, if a link disconnection occurs in the inter-device interface terminated at the inter-device line terminal of the self network device, outputs all frames input via line terminals of the self network device to the lower stage line terminal of the self network device, and if a line in which a link disconnection occurs, notified from the counterpart network device, is the line terminated at the lower stage line terminal of the counterpart network device, outputs all frames input via line terminals of the self network device to the inter-device line terminal of the self network device.

In that case, it is preferable that the load balancing function unit is configured such that when being notified from the counterpart network device of the line terminated at the lower stage line terminal of the counterpart network device as a line in which link is recovered, the load balancing function unit outputs frames input via line terminals of the self network device to the inter-device line terminal of the self network device and to the lower stage line terminal of the self network device in a distributive manner at a predetermined ratio.

Further, a link loss forwarding method, according to another aspect of the present invention, includes arranging a first device and a second device opposite each other, each of the devices having a plurality of line terminals, a lower stage line terminal, and an inter-device line terminal, connecting the inter-device line terminals of the first device and the second device, arranged opposite each other, by an inter-device interface to thereby form a pair of devices and arranging the pairs of devices in multiple stages, connecting the lower stage line terminal of a first device arranged on the upper side and one line terminal of a first device arranged on the lower side, in adjacent stages, by a line, and connecting the lower stage line terminal of a second device arranged on the upper side and one line terminal of a second device arranged on the lower side, in adjacent stages, by a line, wherein each of the devices notifies the counterpart device of a line in which a link disconnection occurs among the lines terminated at the line terminals or the lower stage line terminal of the self device and the cause of the occurrence of the link disconnection is not a forcible closure of a line terminal of the self device, and if a line in which a link disconnection occurs, notified from the counterpart device, is a line other than a line terminated at a lower stage line terminal of the counterpart device, forcibly closes a line terminal of the self device associated with the line in which the link disconnection occurs notified from the counterpart device, while if a line in which a link disconnection occurs, notified from the counterpart device, is the line terminated at the lower stage line terminal of the counterpart device, does not forcibly close the lower stage line terminal of the self device.

In this aspect, each of the devices notifies the counterpart device of a line in which link is recovered among the lines terminated at the line terminals or the lower stage line terminal of the self device, and when being notified from the counterpart device of a line in which link is recovered, links up a line terminal or the lower stage line terminal of the self device associated with the line in which the link is recovered.

Further, if both the line terminated at the lower stage line terminal of the self device and the inter-device interface terminated at the inter-device line terminal of the self device are normal, each of the devices outputs frames input via line terminals of the self device to the inter device line terminal of the self device and to the lower stage line terminal of the self device in a distributive manner at a predetermined ratio, if a link disconnection occurs in the line terminated at the lower stage line terminal of the self device, outputs all frames input via line terminals of the self device to the inter-device line terminal of the self device, if a link disconnection occurs in the inter-device interface terminated at the inter-device line terminal of the self device, outputs all frames input via line terminals of the self device to the lower stage line terminal of the self device, and if a line in which a link disconnection occurs, notified from the counterpart device, is the line terminated at the lower stage line terminal of the counterpart device, outputs all frames input via line terminals of the self device to the inter-device line terminal of the self device.

Further, when being notified from the counterpart device of the line terminated at the lower stage line terminal of the counterpart device as a line in which link is recovered, each of the devices outputs frames input via line terminals of the self device to the inter-device line terminal of the self device and to the lower stage line terminal of the self device in a distributive manner at a predetermined ratio.

Further, a program, which is another aspect of the present invention, is a program for causing a computer to function as a network device, the computer including a plurality of line terminals, a lower stage line terminal, and an inter-device line terminal. The program causes the computer to function as a link control function unit which notifies the counterpart computer, via an inter-device interface terminated at the inter-device line terminal, of a line in which a link disconnection occurs among the lines terminated at the line terminals or the lower stage line terminal of the self computer and the cause of the occurrence of the link disconnection is not a forcible closure of a line terminal of the self computer, and if a line in which a link disconnection occurs, notified from the counterpart computer, is a line other than the line terminated at the lower stage line terminal of the counterpart computer, forcibly closes a line terminal of the self computer associated with the line in which the link disconnection occurs notified from the counterpart computer, while if a line in which a link disconnection occurs, notified from the counterpart computer, is the line terminated at the lower stage line terminal of the counterpart computer, does not forcibly close the lower stage line terminal of the self computer.

In this aspect, the link control function unit notifies the counterpart computer of a line in which link is recovered among the lines terminated at the line terminals or the lower stage line terminal of the self computer, and when being notified from the counterpart computer of a line in which link is recovered, links up a line terminal or the lower stage line terminal of the self computer associated with the line in which the link is recovered.

Further, the program causes the computer to function as a load balancing function unit which, if both the line terminated at the lower stage line terminal of the self computer and the inter-device interface terminated at the inter-device line terminal of the self computer are normal, outputs frames input via line terminals of the self computer to the inter-device line terminal of the self computer and to the lower stage line terminal of the self computer in a distributive manner at a predetermined ratio, if a link disconnection occurs in the line terminated at the lower stage line terminal of the self computer, outputs all frames input via line terminals of the self computer to the inter-device line terminal of the self computer, if a link disconnection occurs in the inter-device interface terminated at the inter-device line terminal of the self computer, outputs all frames input via line terminals of the self computer to the lower stage line terminal of the self computer, and if a line in which a link disconnection occurs, notified from the counterpart computer, is the line terminated at the lower stage line terminal of the counterpart computer, outputs all frames input via line terminals of the self computer to the inter-device line terminal of the self computer.

In that case, when being notified from the counterpart computer of the line terminated at the lower stage line terminal of the counterpart computer as a line in which link is recovered, the load balancing function unit outputs frames input via line terminals of the self computer to the inter-device line terminal of the self computer and to the lower stage line terminal of the self computer in a distributive manner at a predetermined ratio.

While the present invention has been described with reference to the exemplary embodiments described above, the present invention is not limited to these embodiments. It will be understood by those skilled in the art that various changes in form and details may be made therein without departing from the spirit and scope of the present invention as defined by the claims.

The present invention is based upon and claims the benefit of priority from Japanese patent application No. 2009-147317, filed on Jun. 22, 2009, the disclosure of which is incorporated herein in its entirety by reference.

INDUSTRIAL APPLICABILITY

The present invention is applicable to L2SW devices, bridges, L3SWs, routers, gateways, radio relay devices, optical relay devices, and the like which are disposed at terminals or relay points in networks.

REFERENCE NUMERALS 1-8 device
2-A to 2-D, 3-A to 3-D, 5-A to 5-D, 6-A to 6-D, 7-A to 7-D line terminal
21, 31, 2-E, 3-E, 5-E to 6-E lower stage line terminal
2-*a* to 2-*d*, 3-*a* to 3-*d*, 5-*a* to 5-*d*, 6-*a* to 6-*d*, 7-*a* to 7-*d* line
22, 32 switch unit
23, 33 switch core
24, 34 link control function unit
25, 35 load balancing function unit

The invention claimed is:

1. A network system in which a first device and a second device, each having a plurality of line terminals, a lower stage line terminal, and an inter-device line terminal, are arranged opposite each other, the inter-device line terminals of the first device and the second device, arranged opposite each other, are connected by an inter-device interface to thereby form a pair of devices and the pairs of devices are arranged in multiple stages, a lower stage line terminal of a first device arranged on an upper side and one line terminal of a first device arranged on a lower side, in adjacent stages, are connected by a line, and a lower stage line terminal of a second device arranged on an upper side and one line terminal of a second device arranged on a lower side, in adjacent stages, are connected by a line, wherein
each of the devices includes a link control function unit which notifies a counterpart device of a line in which a link disconnection occurs among lines terminated at line terminals or a lower stage line terminal of a self device and a cause of the occurrence of the link disconnection is not a forcible closure of a line terminal of the self device, and when a line in which a link disconnection occurs, notified from the counterpart device, is a line other than a line terminated at a lower stage line terminal of the counterpart device, forcibly closes a line terminal of the self device associated with the line in which the link disconnection occurs notified from the counterpart device, while when a line in which a link disconnection occurs, notified from the counterpart device, is the line terminated at the lower stage line terminal of the counterpart device, does not forcibly close the lower stage line terminal of the self device, and
wherein each of the devices further includes a load balancing function unit which, when both the line terminated at the lower stage line terminal of the self device and an inter-device interface terminated at an inter-device line terminal of the self device are normal, outputs frames input via a line terminal of the self device to the inter-device line terminal of the self device and to the lower stage line terminal of the self device in a distributive manner at a predetermined ratio, when a link disconnection occurs in the line terminated at the lower stage line terminal of the self device, outputs all frames input via a line terminal of the self device to the inter-device line terminal of the self device, when a link disconnection occurs in the inter-device interface terminated at the inter-device line terminal of the self device, outputs all frames input via a line terminal of the self device to the lower stage line terminal of the self device, and when a line in which a link disconnection occurs, notified from the counterpart device, is the line terminated at the lower stage line terminal of the counterpart device, outputs all frames input via a line terminal of the self device to the inter-device line terminal of the self device.

2. The network system, according to claim 1, wherein the link control function unit notifies the counterpart device of a line in which link is recovered among the lines terminated at the line terminals or the lower stage line terminal of the self device, and when being notified from the counterpart device of a line in which link is recovered, links up a line terminal or the lower stage line terminal of the self device associated with the line in which the link is recovered.

3. The network system, according to claim 1, wherein when the load balancing function unit is notified from the counterpart device of the line terminated at the lower stage line terminal of the counterpart device as a line in which link is recovered, the load balancing function unit outputs frames input via a line terminal of the self device to the inter-device line terminal of the self device and to the lower stage line terminal of the self device in a distributive manner at a predetermined ratio.

4. The network system, according to claim 1, wherein the link control function unit sets, in a header section of a frame to be transmitted to the counterpart device, link information indicating a state of each line terminated at each of the line terminals of the self device and link information indicating a state of the line terminated at the lower stage line terminal of the self device, to notify the counterpart device of a line in which a link disconnection occurs among the lines terminated at the line terminals or the lower stage line terminal of the self device and a cause of the occurrence of the link disconnection is not a forcible closure of a line terminal of the self device.

5. The network system, according to claim 4, wherein when there is at least one line in which a link disconnection occurs among the lines terminated at the line terminals of the self device, the link control function unit sets, in the header section of the frame, the link information of each line terminated at each of the line terminals of the self device as link down, and only when all pieces of link information of the respective lines terminated at the line terminals of the counterpart device, set in a frame transmitted from the counterpart device, indicate link down, the link control function unit forcibly closes all of the line terminals of the self device.

6. The network system, according to claim 4, wherein only when link disconnections occur in all of the lines terminated at the line terminals of the self device, the link control function unit sets link information, in the header section of the frame, of each line terminated at each of the line terminals of the self device as link down, and only when the link information of each line terminated at each of the line terminals of the counterpart device, set in a frame transmitted from the counterpart device, indicates link down, the link control function unit forcibly closes all of the line terminals of the self device.

7. A network device comprising
a plurality of line terminals,
a lower stage line terminal,
an inter-device line terminal configured for connection via an inter-device interface opposite to another inter-device line terminal of a counterpart network device,
a link control function unit operatively connected to the line terminals and to the lower stage line terminal, which link control function unit notifies the counterpart network device, via the inter-device interface terminated at the inter-device line terminal, of a line in which a link disconnection occurs among lines terminated at line terminals or a lower stage line terminal of a self network device and a cause of the occurrence of the link disconnection is not a forcible closure of a line terminal of the self network device, and when a line in which a link disconnection occurs, notified from the counterpart network device, is a line other than a line terminated at a lower stage line terminal of the counterpart network device, forcibly closes a line terminal of the self network device associated with the line in which the link disconnection occurs notified from the counterpart network device, while when a line in which a link disconnection occurs, notified from the counterpart network device, is the line terminated at the lower stage line terminal of the counterpart network device, does not forcibly close the lower stage line terminal of the self network device, and
a load balancing function unit which, when both the line terminated at the lower stage line terminal of the self network device and the inter-device interface terminated at the inter-device line terminal of the self network device are normal, outputs frames input via a line terminal of the self network device to the inter-device line terminal of the self network device and to the lower stage line terminal of the self network device in a distributive manner at a predetermined ratio, when a link disconnection occurs in the line terminated at the lower stage line terminal of the self network device, outputs all frames input via a line terminal of the self network device to the inter-device line terminal of the self network device, when a link disconnection occurs in the inter-device interface terminated at the inter-device line terminal of the self network device, outputs all frames input via a line terminal of the self network device to the lower stage line terminal of the self network device, and when a line in which a link disconnection occurs, notified from the counterpart network device, is the line terminated at the lower stage line terminal of the counterpart network device, outputs all frames input via a line terminal of the self network device to the inter-device line terminal of the self network device.

8. The network device, according to claim 7, wherein the link control function unit notifies the counterpart network device of a line in which link is recovered among the lines terminated at the line terminals or the lower stage line terminal of the self network device, and when being notified from the counterpart network device of a line in which link is recovered, links up a line terminal or the lower stage line terminal of the self network device associated with the line in which the link is recovered.

9. The network device, according to claim 7, wherein when the load balancing function unit is notified from the counterpart network device of the line terminated at the lower stage line terminal of the counterpart network device as a line in which link is recovered, the load balancing function unit outputs frames input via a line terminal of the self network device to the inter-device line terminal of the self network device and to the lower stage line terminal of the self network device in a distributive manner at a predetermined ratio.

10. A link loss forwarding method including arranging a first device and a second device opposite each other, each of the devices having a plurality of line terminals, a lower stage line terminal, and an inter-device line terminal, connecting the inter-device line terminals of the first device and the second device, arranged opposite each other, by an inter-device interface to thereby form a pair of devices and arranging the pairs of devices in multiple stages, connecting a lower stage line terminal of a first device arranged on an upper side and one line terminal of a first device arranged on a lower side, in adjacent stages, by a line, and connecting a lower stage line terminal of a second device arranged on an upper side and one line terminal of a second device arranged on a lower side, in adjacent stages, by a line,
wherein each of the devices notifies a counterpart device of a line in which a link disconnection occurs among lines terminated at line terminals or a lower stage line terminal of a self device and a cause of the occurrence of the link disconnection is not a forcible closure of a line terminal of the self device, and when a line in which a link disconnection occurs, notified from the counterpart device, is a line other than a line terminated at a lower stage line terminal of the counterpart device, forcibly closes a line terminal of the self device associated with the line in which the link disconnection occurs notified from the counterpart device, while when a line in which a link disconnection occurs, notified from the counterpart device, is the line terminated at the lower stage line terminal of the counterpart device, does not forcibly close the lower stage line terminal of the self device, and
wherein when both the line terminated at the lower stage line terminal of the self device and an inter-device interface terminated at an inter-device line terminal of the self device are normal, each of the devices outputs frames input via a line terminal of the self device to the inter-device line terminal of the self device and to the lower stage line terminal of the self device in a distributive manner at a predetermined ratio, when a link disconnection occurs in the line terminated at the lower stage line terminal of the self device, outputs all frames input via a line terminal of the self device to the inter-device line terminal of the self device, when a link disconnection occurs in the inter-device interface terminated at the inter-device line terminal of the self device, outputs all frames input via a line terminal of the self device to the lower stage line terminal of the self device, and when a line in which a link disconnection occurs, notified from the counterpart device, is the line terminated at the lower stage line terminal of the counterpart device, outputs all frames input via a line terminal of the self device to the inter-device line terminal of the self device.

11. The link loss forwarding method, according to claim 10, wherein
each of the devices notifies the counterpart device of a line in which link is recovered among the lines terminated at the line terminals or the lower stage line terminal of the self device, and when being notified from the counterpart device of a line in which link is recovered, links up a line terminal or the lower stage line terminal of the self device associated with the line in which the link is recovered.

12. The link loss forwarding method, according to claim 10, wherein
when each of the devices is notified from the counterpart device of the line terminated at the lower stage line terminal of the counterpart device as a line in which link is recovered, the device outputs frames input via a line terminal of the self device to the inter-device line terminal of the self device and to the lower stage line terminal of the self device in a distributive manner at a predetermined ratio.

13. A non-transitory computer-readable medium storing a program comprising instructions for causing a computer to function as a network device, the computer including a plurality of line terminals, a lower stage line terminal, and an inter-device line terminal,
wherein the program causes the computer to function as a link control function unit which notifies a counterpart computer, via an inter-device interface terminated at the inter-device line terminal, of a line in which a link disconnection occurs among lines terminated at line terminals or a lower stage line terminal of a self computer and a cause of the occurrence of the link disconnection is not a forcible closure of a line terminal of the self computer, and when a line in which a link disconnection occurs, notified from the counterpart computer, is a line other than a line terminated at a lower stage line terminal of the counterpart computer, forcibly closes a line terminal of the self computer associated with the line in which the link disconnection occurs notified from the counterpart computer, while when a line in which a link disconnection occurs, notified from the counterpart computer, is the line terminated at the lower stage line terminal of the counterpart computer, does not forcibly close the lower stage line terminal of the self computer, and wherein the program further causes the computer to function as a load balancing function unit which, when both the line terminated at the lower stage line terminal of the self computer and the inter-device interface terminated at the inter-device line terminal of the self computer are normal, outputs frames input via a line terminal of the self computer to the inter-device line terminal of the self computer and to the lower stage line terminal of the self computer in a distributive manner at a predetermined ratio, when a link disconnection occurs in the line terminated at the lower stage line terminal of the self computer, outputs all frames input via a line terminal of the self computer to the inter-device line terminal of the self computer, when a link disconnection occurs in the inter-device interface terminated at the inter-device line terminal of the self computer, outputs all frames input via a line terminal of the self computer to the lower stage line terminal of the self computer, and when a line in which a link disconnection occurs, notified from the counterpart computer, is the line terminated at the lower stage line terminal of the counterpart computer, outputs all frames input via a line terminal of the self computer to the inter-device line terminal of the self computer.

14. The computer-readable medium storing the program, according to claim 13, wherein
the link control function unit notifies the counterpart computer of a line in which link is recovered among the lines terminated at the line terminals or the lower stage line terminal of the self computer, and when being notified from the counterpart computer of a line in which link is recovered, links up a line terminal or the lower stage line terminal of the self computer associated with the line in which the link is recovered.

15. The computer-readable medium storing the program, according to claim 13, wherein
when the load balancing function unit is notified from the counterpart computer of the line terminated at the lower stage line terminal of the counterpart computer as a line in which link is recovered, the load balancing function unit outputs frames input via a line terminal of the self computer to the inter-device line terminal of the self computer and to the lower stage line terminal of the self computer in a distributive manner at a predetermined ratio.

* * * * *